United States Patent [19]

Masuoka et al.

[11] Patent Number: 5,663,846
[45] Date of Patent: Sep. 2, 1997

[54] DRIVING APPARATUS FOR FLOATING-TYPE MAGNETIC HEAD

[75] Inventors: Dai Masuoka, Kanagawa; Takeda Toru, Saitama, both of Japan

[73] Assignee: Sony Corporation, Japan

[21] Appl. No.: 403,858

[22] PCT Filed: Aug. 24, 1994

[86] PCT No.: PCT/JP94/01396

§ 371 Date: Mar. 23, 1995

§ 102(e) Date: Mar. 23, 1995

[87] PCT Pub. No.: WO95/06314

PCT Pub. Date: Mar. 2, 1995

[30] Foreign Application Priority Data

| Aug. 24, 1993 | [JP] | Japan | 5-230991 |
| Jun. 17, 1994 | [JP] | Japan | 6-159352 |
| Aug. 1, 1994 | [JP] | Japan | 6-199040 |

[51] Int. Cl.$^6$ ............................................. G11B 21/02
[52] U.S. Cl. ............... 360/75; 360/78.06; 360/78.13; 360/105; 318/811; 388/804
[58] Field of Search .................... 360/75, 78.06, 360/78.13, 105, 78.12; 318/810, 811; 388/804

[56] References Cited

U.S. PATENT DOCUMENTS

| 4,329,721 | 5/1982 | Lee | 360/78.06 |
| 4,864,437 | 9/1989 | Couse et al. | 360/75 |
| 5,128,568 | 7/1992 | Carpenter | 360/75 |
| 5,384,675 | 1/1995 | Crawforth et al. | 360/75 |
| 5,455,496 | 10/1995 | Williams | 360/75 |

FOREIGN PATENT DOCUMENTS

| 117405 | 10/1978 | Japan | 360/75 G |
| 1079981 | 3/1989 | Japan . | |
| 2053271 | 2/1990 | Japan . | |
| 3100981 | 4/1991 | Japan . | |

OTHER PUBLICATIONS

Electric Motors & Their Controls, by Kenja, © 1991 pp. 130–135.

Primary Examiner—Aristotelis M. Psitos
Assistant Examiner—Alan Faber
Attorney, Agent, or Firm—Ronald P. Kananen

[57] ABSTRACT

A loading and unloading device for loading and unloading a head slider has an actuator driver circuit 11 for driving an actuator 3 with pulses. A counterelectromotive force generated by a voice coil of the actuator is detected when the pulses are off, and fed back to the actuator driver circuit 11 to enable the actuator driver circuit 11 to control the position and speed of the actuator. The speed at which the head slider is loaded and unloaded can thus be controlled into a desired value to minimize the danger of collision between a head and a disk.

35 Claims, 32 Drawing Sheets

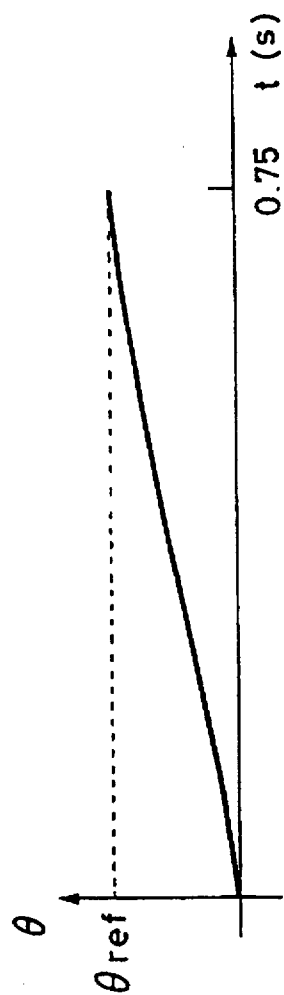
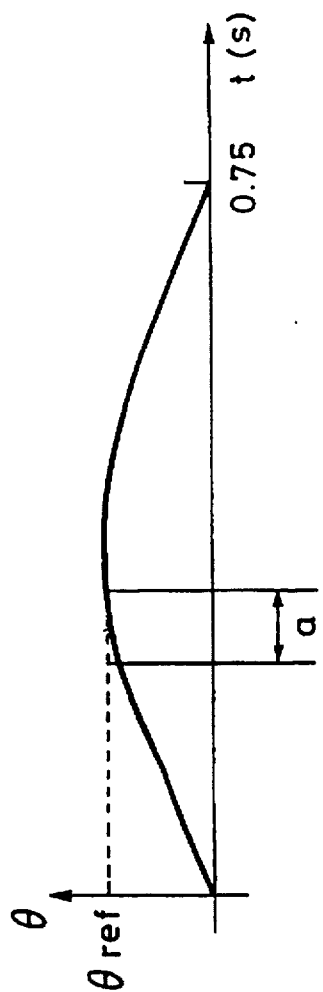
FIG. 6A
FIG. 6B

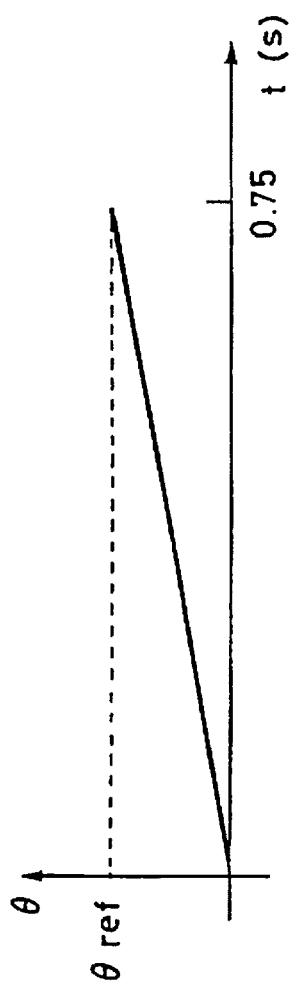
FIG. 20A  Rotational Angle of Actuator
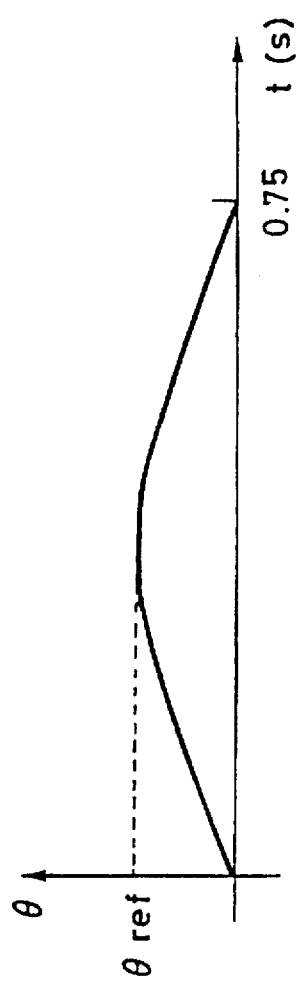
FIG. 20B  Angular Velocity of Actuator
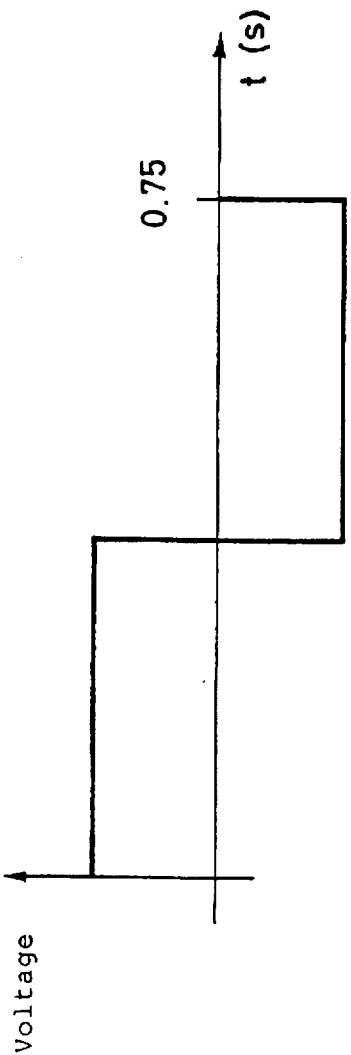
FIG. 20C  Drive Voltage

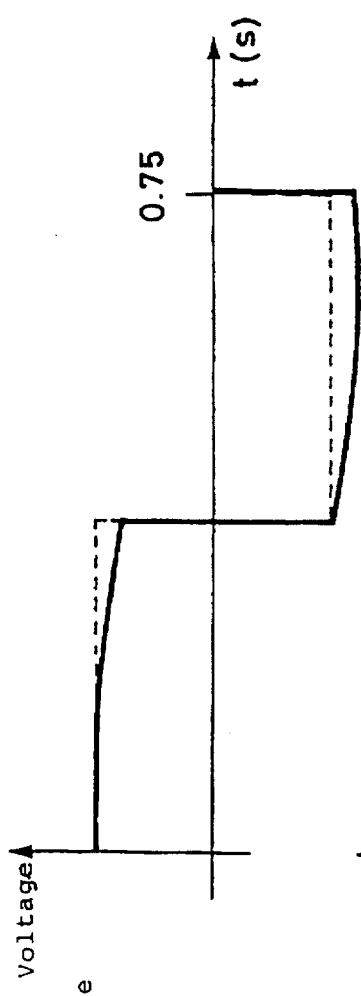
FIG. 21A  Voltage Across Voice Coil
FIG. 21B  Output of Voltage Differential Gen. 17
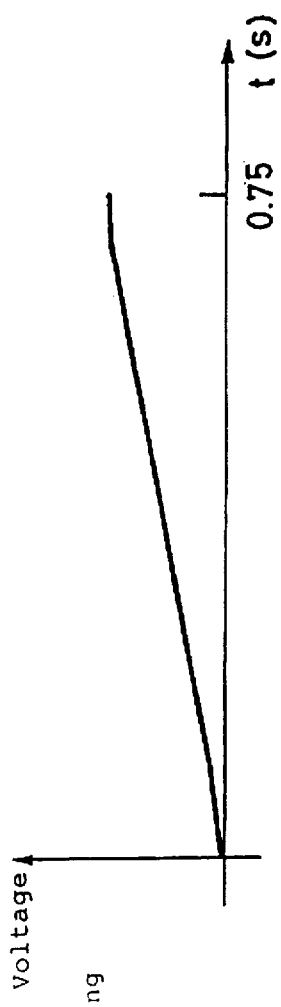
FIG. 21C  Output of Integrating CKT 15

DRIVING APPARATUS FOR FLOATING-TYPE MAGNETIC HEAD

TECHNICAL FIELD

The present invention relates to a large-capacity storage device for use with an information processing apparatus, and more particularly to a loading and unloading apparatus for starting and stopping a rotary-disk storage device such as a magnetic disk, an optical disk, or the like, and a drive control circuit for such a loading and unloading apparatus.

BACKGROUND ART

There has heretofore been known a magnetic disk device of the ramp loading type, i.e., a magnetic disk device of the dynamic loading/unloading type, which is a version of the so-called non-contact start-stop (N-CSS) system in which a magnetic head is held out of contact with a disk. Such a magnetic disk device is arranged as shown in FIG. 1 of the accompanying drawings.

As shown in FIG. 1, a magnetic disk device 1 includes a magnetic disk 2 which can be rotated and an actuator 3 which supports a head slider for movement in a slightly floating condition radially over the surface of the magnetic disk 2.

The actuator 3 comprises an arm 5 supported for rotation about a rotational shaft 4, a head slider 7 supported on a distal end of the arm 5 by a suspension 6, and a voice coil motor having a voice coil 8 for rotating the arm 5 about the rotational shaft 4.

The head slider 7 has a magnetic head (not shown).

The magnetic disk device 1 also includes a cam follower 6a extending from a distal end of the suspension 6, and a cam 9 disposed in the vicinity of an outer circumferential edge of the magnetic disk 2. These components make up a loading and unloading apparatus.

With the magnetic disk device 1 thus arranged, the head slider 7 is kept slightly floated off the surface of the magnetic disk 2 which is rotating.

When the arm 5 is rotated about the rotational shaft 4, the head slider 7 moves radially over the surface of the magnetic disk 2 thereby accessing tracks positioned circumferentially on the magnetic disk 2.

When the magnetic disk device 1 starts and stops operating, loading and unloading operations are carried out as follows:

In the loading operation, the arm 5 is turned about the rotational shaft 4 by the voice coil 8 to move the cam follower 6a radially inwardly of the magnetic disk 2, i.e., in the direction indicated by the arrow R1 from a parking area 9a of the cam 9.

As the arm 5 is turned, therefore, the head slider 7 is lifted over the magnetic disk 2 and thereafter lowered along a cam surface 9b of the cam into a position near the surface of the magnetic disk 2.

In the unloading operation, the arm 5 is turned about the rotational shaft 4 by the voice coil 8 to move the cam follower 6a radially outwardly of the magnetic disk 2. While the cam follower 6a is being held in abutment against the cam surface 9b, which is a slanted surface, of the cam 9, the cam follower 6a is lifted and moved in the direction indicated by the arrow R2 toward the parking area 9a.

As the arm 5 is turned, therefore, the head slider 7 is moved away from the surface of the magnetic disk 2, and thereafter lifted along the cam surface 9b of the cam 9.

Subsequently, the head slider 7 is carried onto the parking area 9a of the cam 9.

The loading speed is generally given as a considerably high speed for enabling the head slider 7 to move from the parking area 9a onto the magnetic disk 2 against the resistance due to the friction between the cam follower 6a and the cam 9.

The unloading speed is generally given also as a considerably high speed for enabling the head slider 7 to move from the magnetic disk 2 onto the parking area 9a against the resistance due to the friction between the cam follower 6a and the cam 9.

In case of emergency such as a power failure while the head slider 7 is floating, the magnetic disk device 1 unloads the head slider 7 to retract the same. The unloading speed at this time (the unloading speed at the time the head slider 7 is retracted will hereinafter be referred to as a "retracting speed") is generally given as a considerably high speed. The retraction is an Unloading action in case of emergency.

A magnetic disk device of the so-called contact start-stop (CSS) configuration in which a magnetic head is held in contact with a disk is arranged as shown in FIG. 2 of the accompanying drawings. Those parts in FIG. 2 which are identical to those shown in FIG. 1 are denoted by identical reference characters, and will not be described in detail below.

As shown in FIG. 2, a magnetic disk device 1a has a CSS zone CSS in a retraction area in a radially inner region of a magnetic disk 2a, the retraction area being outside of a data area. The magnetic disk device 1a also has a stopper 3c for mechanically stopping operation of an actuator 3a to stop movement of a head slider 7 radially inwardly of the magnetic disk 2a at the CSS zone CSS.

With the magnetic disk device 1a, the head slider 7 is kept slightly floated off the surface of the magnetic disk 2a which is rotating. When the arm 5 is rotated about the rotational shaft 4, the head slider 7 is moved radially over the surface of the magnetic disk 2a to access tracks on the magnetic disk 2a.

When the magnetic disk device 1a starts and stops operating, loading and unloading operation are carried out. In loading operation, when the magnetic disk 2a is rotated with the head slider 7 held in the CSS zone CSS, the head slider 7 is floated off the magnetic disk 2a, and then when the arm 5 is turned about the rotational shaft 4 by the voice coil 8, the head slider 7 is moved radially outwardly of the magnetic disk 2a toward the data zone in the direction indicated by the arrow R2.

In the unloading operation, when the arm 5 is turned about the rotational shaft 4 by the voice coil 8, the head slider 7 is moved radially inwardly of the magnetic disk 2a in the direction indicated by the arrow R1. Abutment of the actuator 3a against the stopper 3c stops the angular movement of the arm 5, whereupon the magnetic disk 2a stops its rotation.

Therefore, as the arm 5 is turned, the head slider 7 is carried into the CSS zone CSS while floating off the surface of the magnetic disk 2. When the magnetic disk 2a is stopped against rotation, the head slider 7 is brought into and held in contact with the CSS zone CSS.

In the event of an emergency such as a power failure while the head slider is floating, the head slider 7 is unloaded or retracted at a retraction speed which is generally considerably high.

The actuators 3, 3a of the magnetic disk devices comprise a source of magnetic fluxes such as a permanent magnet and a voice coil motor. In the conventional loading/unloading apparatus, the speed at which the actuators 3, 3a are driven, i.e., the speed at which the head slider 7 is loaded and unloaded, is generally not controlled, or not adjusted to a desirable speed.

Therefore, when the head slider 7 is loaded onto or unloaded from the magnetic disks 2, 2a, the head slider 7 tends to collide with the magnetic disks 2, 2a.

In the magnetic disk device of the dynamic loading/ unloading type, the speed at which the head slider 7 moves vertically toward and away from the surface of the magnetic disk 2 is calculated by converting the angular velocity at which the actuator 3 rotates along the surface of the magnetic disk 2 clockwise or counterclockwise in a θ direction about the rotational shaft 4, i.e., the speed at which the head slider 7 moves in the direction R1 or R2, at a certain ratio that is determined by the angle of inclination of the cam surface 9b, which is a ramp, of the cam 9.

The relationship between the speeds of the head slider 7 in the vertical directions when the head slider 7 is loaded and unloaded, i.e., the loading and unloading speeds, and the magnitudes of shocks produced when the head slider 7 collides with the surface of the magnetic disk 2 is illustrated in a graph shown in FIG. 3 of the accompanying drawings.

The magnitudes of shocks plotted in the graph are represented as output voltages from an AE sensor. A study of FIG. 3 indicates that as the loading and unloading speeds increase, the shocks produced when the head slider 7 collides with the magnetic disk 2 increase.

FIG. 4 of the accompanying drawings shows the relationship between the speed of the head slider 7 in a horizontal direction when the head slider 7 is retracted, i.e., the retracting speed, and the magnitudes of shocks produced when the head slider 7 collides with the surface of the magnetic disk 2, the magnitudes of shocks being detected by an AE sensor. It can be seen from FIG. 4 that as the retracting speed increases, the shocks produced by collisions between the head slider 7 and the magnetic disk 2 also increase.

In the magnetic disk device of the CSS system, when the head slider is unloaded, the actuator 3a collides with the stopper 3c, and then the head slider 7 collides with the magnetic disk 2a due to shocks produced by the collision between the actuator 3a and the stopper 3c. As the unloading speed increases, the shocks produced by the collision between the head slider 7 and the magnetic disk 2a increase.

When the shocks produced by the collision between the head slider 7 and the magnetic disks 2, 2a increase, the head slider 7 may be broken and the surfaces of the magnetic disks 2, 2a may be damaged.

Since various data are recorded as magnetic information on the magnetic disks 2, 2a, any damage to the surfaces of the magnetic disks 2, 2a may possibly result in a failure to read the magnetic information therefrom.

In the retracting operation, the retracting speed needs to be higher because the head slider 7 is retracted in case of emergency. The higher retracting speed causes larger shocks to be produced by the collision, resulting in a greater danger of damage.

In view of the above shortcomings, it is an object of the present invention to provide a loading and unloading apparatus for controlling loading and unloading speeds and positions, including those upon retraction, so as to be of desired values, to avoid collisions between a head and a disk as much as possible to allow the head to read recorded information safely from the disk.

In a magnetic disk device of the N-CSS type, a magnetic head slider with a magnetic head mounted thereon is held out of contact with a disk. Therefore, no positional or speed information can be read from the disk when the head slider starts being loaded, i.e., moving from a retracted position, and also when the head slider starts being unloaded, i.e., returning from a data zone to the retracted position.

Therefore, the principles of the present invention are applicable to a magnetic disk device of the N-CSS type when the head slider is retracted due to a power failure or the like, loaded, and unloaded.

In a magnetic disk device of the CSS type, when a disk starts rotating while a head is held in contact with the disk, a head slider floats off the disk, and can immediately read positional or speed information from the disk. When the head slider is unloaded, positional or speed information can be read from the disk after the rotation of the disk has stopped until the head slider contacts the disk. Therefore, the principles of the present invention are not applicable to a magnetic disk device of the CSS type when the head slider is loaded and unloaded except where disk surface information is not recorded in the retraction zone (CSS zone), but applicable only when the head slider is retracted in case of emergency, i.e., retracted, at the time the power supply is shut off and no information can be read from the disk.

DISCLOSURE OF THE INVENTION

According to the present invention, the above object can be achieved by a loading and unloading apparatus for driving an arm having a head slider with an actuator to load the head slider onto and unload the head slider from a rotatable information recording disk, characterized in that the actuator is driven by a driver circuit and a counterelectromotive force of a voice-coil-type drive mechanism of the actuator is detected and fed back to the driver circuit to enable the driver circuit to control a position and speed of the actuator.

According to the present invention, the above object can also be achieved by a loading and unloading apparatus for a magnetic disk device having a rotatable information recording disk, an arm supporting a head slider with a suspension for movement along a surface of the disk, a voice-coil-type drive mechanism for driving the arm, and a mechanism for retracting the head slider into a retraction area out of a data zone of the disk, the loading and unloading apparatus comprising circuit means for energizing the voice-coil-type drive mechanism, means for measuring a counterelectromotive force generated by a voice coil of the voice-coil-type drive mechanism, means for calculating a speed of the arm from a voltage value of the counterelectromotive force, and means for adjusting a drive current based on the speed of the arm; the arrangement being such that closed-loop control is carried out based on the speed of the arm when the head slider is loaded or unloaded.

The retraction area may be formed outside of the disk in a non-contact start-stop configuration.

The retraction area may be formed on the disk in a contact start-stop configuration.

Preferably, the loading and unloading apparatus further comprises means for calculating a position of the arm from the speed of the arm, and means for adjusting a drive current value based on the speed of the arm and the position of the arm, the arrangement being such that closed-loop control is carried out based on the speed of the arm and the position of the arm when the head slider is loaded or unloaded.

Preferably, the circuit means comprises a pulse drive circuit, and the means for measuring comprises a sampling measuring circuit.

Preferably, the pulse drive circuit comprises a pulse-width-modulation circuit or a pulse-width-amplitude circuit.

The circuit means comprises an analog drive circuit, and the means for measuring comprises an analog measuring circuit.

Preferably, the pulse drive circuit has a drive frequency f represented by:

$$f < R/2L$$

where R is a resistance component of the voice-coil-type drive mechanism and L is an inductance component of the voice-coil-type drive mechanism.

Preferably, the speed of the arm is controlled such that the speed of the head slider with respect to the disk when the head slider is loaded onto or unloaded from the disk does not exceed 140 mm/s in a direction parallel to the surface of the disk.

Preferably, the speed of the arm is controlled such that the speed of the head slider with respect to the disk when the head slider is loaded onto or unloaded from the disk does not exceed 20 mm/s in a direction perpendicular to the surface of the disk.

The means for calculating a speed of the arm measures a speed of the arm a plurality of times and thereafter averages measured speeds.

The means for calculating a position of the arm calculates the position of the arm by integrating the speed which has been detected by the means for calculating a speed of the arm.

Preferably, the head slider is unloaded by a counterelectromotive force of a motor which rotates the disk when the head slider is to be retracted.

Preferably, the head slider is unloaded by electric energy stored in a capacitor or an electric power storage device associated with the loading and unloading apparatus when the head slider is to be retracted.

The head slider is loaded and unloaded into a position in an outer circumferential region of the disk, which position is determined by r1<θ<r2 (r1, r2 are constants where r1<r2) and θ1<r<θ2 (θ1, θ2 are constants where θ1<θ2) where r represents a position in the radial direction of the disk and θ represents a position in the circumferential direction of the disk.

According to the present invention, the above object can also be accomplished by a drive control circuit for a loading and unloading apparatus for driving an arm having a head slider with an actuator to load the head slider onto and unload the head slider from a rotatable information recording disk, the drive control circuit being connected to the actuator, characterized in that the actuator is driven by a driver circuit and a counterelectromotive force of a voice-coil-type drive mechanism of the actuator is detected and fed back to the driver circuit to enable the driver circuit to control a position and speed of the actuator.

According to the present invention, the above object can also be accomplished by a drive control circuit for a loading and unloading apparatus of the non-contact start-stop type for a magnetic disk device having a rotatable information recording disk, an arm supporting a head slider with a suspension for movement along a surface of the disk, a voice-coil-type drive mechanism for driving the arm, and a mechanism for retracting the head slider into a retraction area outside of the disk, the drive control circuit being connected to the voice-coil-type drive mechanism, the drive control circuit comprising circuit means for energizing the voice-coil-type drive mechanism, means for measuring a counterelectromotive force generated by a voice coil of the voice-coil-type drive mechanism, means for calculating a speed of the arm from a voltage value of the counterelectromotive force, and means for adjusting a drive current based on the speed of the arm, the arrangement being such that closed-loop control is carried out based on the speed of the arm when the head slider is loaded or unloaded.

According to the present invention, the above object can also be accomplished by a drive control circuit for a loading and unloading apparatus of the contact start-stop type for a magnetic disk device having a rotatable information recording disk, an arm supporting a head slider with a suspension for movement along a surface of the disk, a voice-coil-type drive mechanism for driving the arm, and a mechanism for retracting the head slider into a retraction area other than a data zone of the disk, the drive control circuit being connected to the voice-coil-type drive mechanism, the drive control circuit comprising circuit means for energizing the voice-coil-type drive mechanism, means for measuring a counterelectromotive force generated by a voice coil of the voice-coil-type drive mechanism, means for calculating a speed of the arm from a voltage value of the counterelectromotive force, and means for adjusting a drive current based on the speed of the arm, the arrangement being such that closed-loop control is carried out based on the speed of the arm when the head slider is loaded or unloaded.

Preferably, the drive control circuit further comprises means for calculating a position of the arm from the speed of the arm, and means for adjusting a drive current value based on the speed of the arm and the position of the arm, the arrangement being such that closed-loop control is carried out based on the speed of the arm and the position of the arm when the head slider is loaded or unloaded.

Preferably, the means for measuring a counterelectromotive force comprises sampling means for sampling the counterelectromotive force generated by the voice coil, the sampling means comprising switches each composed of a MOSFET.

The switch may comprise an analog switch.

The means for measuring a counterelectromotive force grounds both terminals of the voice coil after a drive pulse is turned off and until the counterelectromotive force is measured.

The means for measuring a counterelectromotive force comprises a switch for preventing oscillation, the switch being turned off when a drive pulse is turned off.

Preferably, after the arm is loaded onto or unloaded from the disk at a desired speed, the arm moves over the disk at the desired speed into abutment against a stopper, and the arm finishes a loading or unloading process upon elapse of a period of time sufficient for the head slider to stop outside of a recording area of the disk.

Preferably, after the arm is loaded onto the disk at a desired speed, the arm moves over the disk at the desired speed, and the arm finishes a loading or unloading process when a head receives a signal indicating that the arm has been loaded from the disk.

The drive control circuit may further include a function to energize a spindle motor to drive the disk.

With the above arrangement, since it is possible to accurately detect a counterelectromotive force generated by the voice coil which drives the actuator, the speed at which the head slider is loaded and unloaded can be controlled with high accuracy. Therefore, the danger of collision between a head and the disk is minimized when the head slider is loaded and unloaded, and the head slider can be loaded and unloaded with safety.

BRIEF DESCRIPTION OF THE DRAWINGS

FIGS. 6A and 6B are diagrams showing rotational angles and angular velocities of an actuator in the magnetic disk device shown in FIG. 5;

FIGS. 20A, 20B, and 20C are diagrams showing rotational and angles and angular velocities of an actuator, and a drive voltage of a drive circuit in the magnetic disk device shown in FIG. 19;

FIGS. 21A, 21B, and 21C are timing charts showing, respectively, a voltage across a voice coil, an output signal from a voltage differential generator, and an output signal from an integrating circuit in the magnetic disk device shown in FIG. 19;

BEST MODE FOR CARRYING OUT THE INVENTION

Preferred embodiments of the present invention will hereinafter be described in detail below with reference to the accompanying drawings.

The embodiments which will be described below contain various technically preferable limitations as they illustrate preferred examples of the present invention. However, the scope of the present invention is not limited to these examples.

Figure 5:
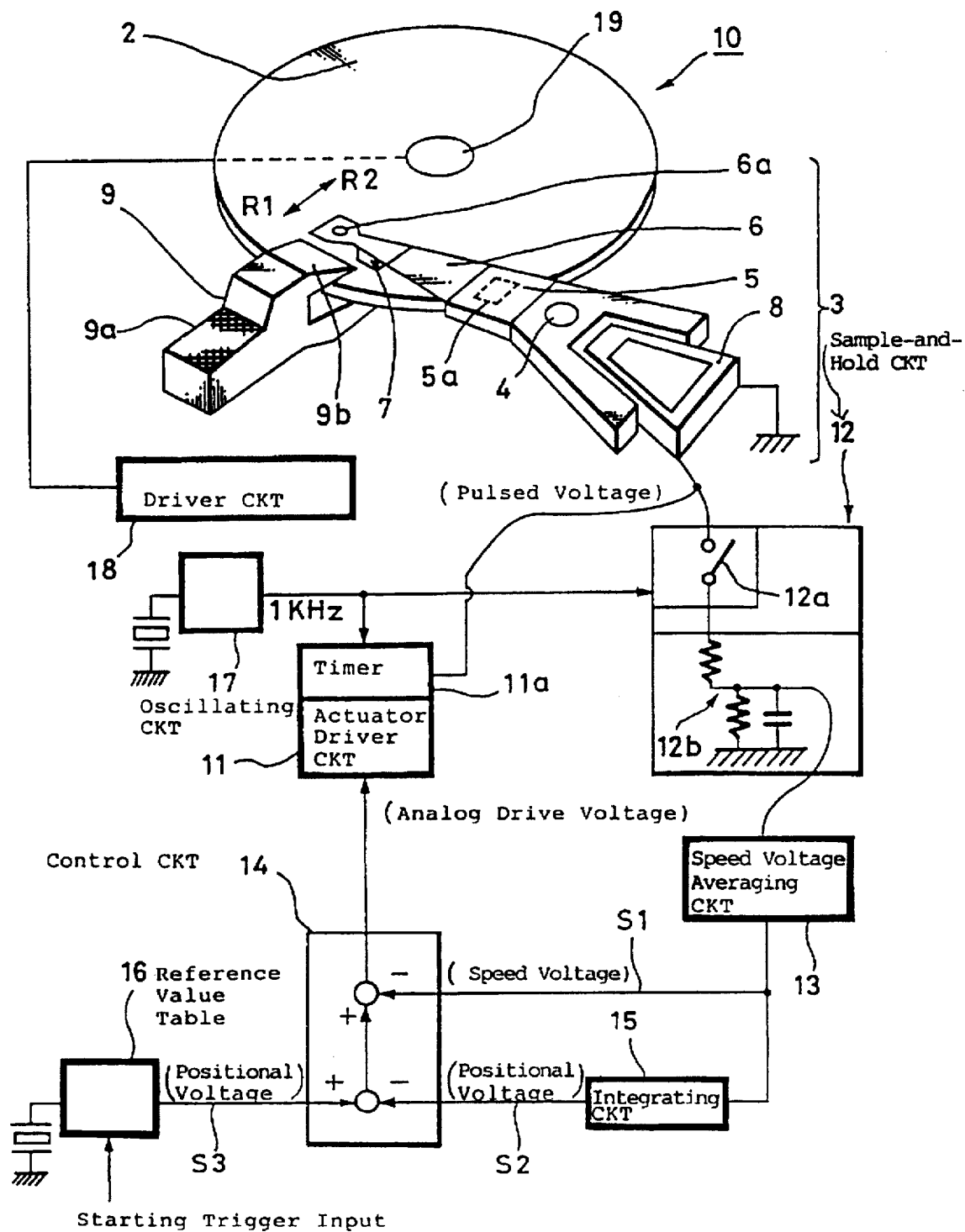
FIG. 5 is a view of a magnetic disk device which incorporates a loading and unloading apparatus according to a first embodiment of the present invention.

FIG. 5 is a view of a magnetic disk device which incorporates a loading and unloading apparatus according to a first embodiment of the present invention.

As shown in FIG. 5, the magnetic disk device, generally denoted at 10, includes a magnetic disk 2 which can be rotated and an actuator 3 which supports a head slider for movement in a slightly floating condition radially over the surface of the magnetic disk 2.

The actuator 3 comprises an arm 5 supported for rotation about a rotational shaft 4, a head slider 7 supported on a distal end of the arm 5 by a suspension 6, and a voice coil 8 for rotating the arm 5 about the rotational shaft 4.

The magnetic disk device 10 also includes a cam follower 6a extending from a distal end of the suspension 6, and a cam 9 disposed in the vicinity of an outer circumferential edge of the magnetic disk 2. These components make up a loading and unloading apparatus of the dynamic loading/ unloading type.

Figure 1:
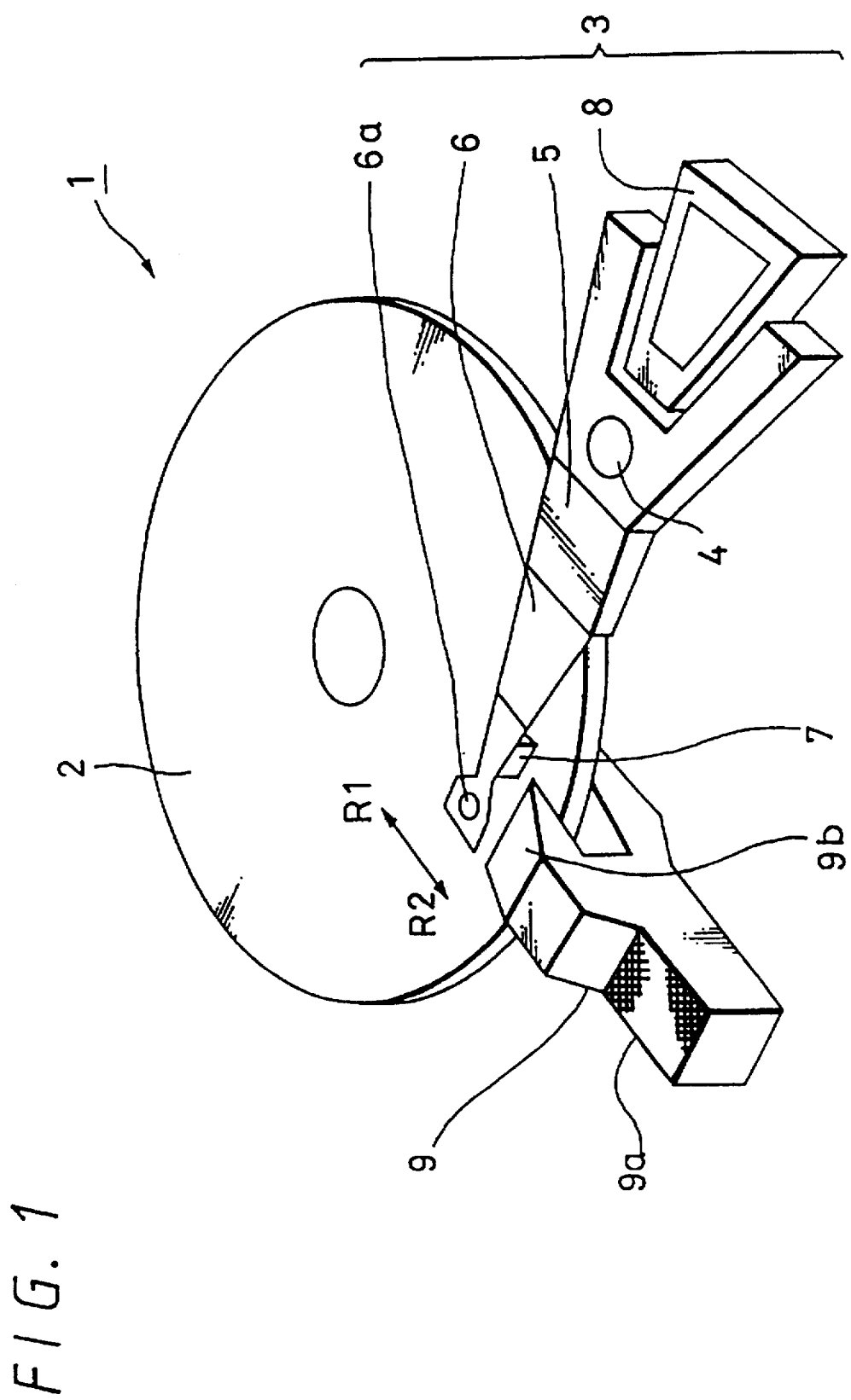
FIG. 1 is a perspective view of a magnetic disk device which incorporates a conventional loading and unloading apparatus of the ramp loading type.

The structure described above is identical to that of the conventional magnetic disk device 1 of the dynamic loading/ unloading type shown in FIG. 1. In the magnetic disk device 10 according to this embodiment, the voice coil 8 of the actuator 3 can be energized by an actuator driver circuit 11 and is connected to a sample-and-hold circuit 12.

The sample-and-hold circuit 12 serves as a means for measuring a counterelectromotive force produced by the voice coil 8, and a speed voltage averaging circuit 13 is connected to the sample-and-hold circuit 12. An output signal from the sample-and-hold circuit 12 is averaged by the speed voltage averaging circuit 13, which applies its output signal as a speed voltage S1 directly to a control circuit 14.

More preferably, the output signal from the sample-and-hold circuit 12 is supplied through the speed voltage averaging circuit 13 to an integrating circuit 15, which applies its output signal as a positional voltage S2 to the control circuit 14. The control circuit 14 is supplied with a reference positional voltage S3 from a reference value table 16.

An oscillating circuit 17 is connected to the actuator driver circuit 11 to apply a signal having a frequency of 1 kHz, for example, to the actuator driver circuit 11. The control circuit 14 is connected to the actuator driver circuit 11 to apply its output signal to the actuator driver circuit 11.

Preferably, the actuator driver circuit 11 has a timer 11a for generating a timing signal to end a loading or unloading process.

The signal from the oscillating circuit 17 is also supplied to the sample-and-hold circuit 12 as a timing clock signal for sampling and holding the counterelectromotive force produced by the voice coil 8.

The magnetic disk 2 can be rotated by a motor 19. The magnetic disk device 10 has a driver circuit 18 for energizing the motor 19 to rotate the magnetic disk 2.

The actuator driver circuit 11 generates a pulsed voltage having a frequency of 1 kHz and an amplitude of 0.5 V based on the signal from the oscillating circuit 17, and drives the actuator 3 with the generated pulsed voltage. When the drive voltage is on at the time the head slider 7 is unloaded (retracted), the distal end of the actuator 3 is turned in the direction indicated by the arrow R1. When the drive voltage is on at the time the head slider 7 is loaded, the distal end of the actuator 3 is turned in the direction indicated by the arrow R2.

When the drive voltage is off at the time the head slider 7 is loaded or unloaded (retracted), the distal end of the actuator 3 continues to move in the direction R1 or R2 due to inertia.

At this time, a sampler 12a of the sample-and-hold circuit 12 is turned on, and a counterelectromotive force proportional to the rotational speed of the actuator 3 is sampled and held by a holder 12b, which outputs the sampled and held counterelectromotive force as an output voltage.

The output voltage from the sample-and-hold circuit 12 is averaged by the speed voltage averaging circuit 13 and thereafter integrated by the integrating circuit 15, which applies the integrated voltage as a positional voltage S2 to the control circuit 14.

The control circuit 14 compares the positional voltage S2 from the integrating circuit 15 with a reference position voltage S3 established by the reference value table 16, and feeds the result back to the actuator driver circuit 11. The actuator driver circuit 11 varies the duty ratio of pulses, for example, to control the actuator 3 to operate at a desired speed by way of PWM (pulse width modulation).

In the event that the electric power cannot normally be supplied due to a power failure or the like, the magnetic disk device 10 uses for the retracting operation a counterelectromotive force that is generated by the voice coil 8 upon rotation of the magnetic disk 2.

Operation will be described in detail below.

The actuator driver circuit 11 comprises an H-bridge voltage drive VCM controller, for example, for energizing the actuator 3 with a pulsed voltage having a frequency of 1 kHz, a voltage value of 0.5 V, and a duty ratio of 50%. When the head slider is to be unloaded (retracted), the actuator 3 is turned in the direction R1, and with the drive voltage being turned off, the counterelectromotive force that is generated by the voice coil 8 is supplied to the sample-and-hold circuit 12.

FIGS. 6A and 6B show time-dependent waveforms of elements produced as the actuator 3 operates.

In FIGS. 6A and 6B, one loading or unloading (retracting) cycle takes about 0.75 second. FIG. 6A shows the rotational angle of the actuator 3, and FIG. 6B shows the angular velocity of the actuator 3.

Figure 7:
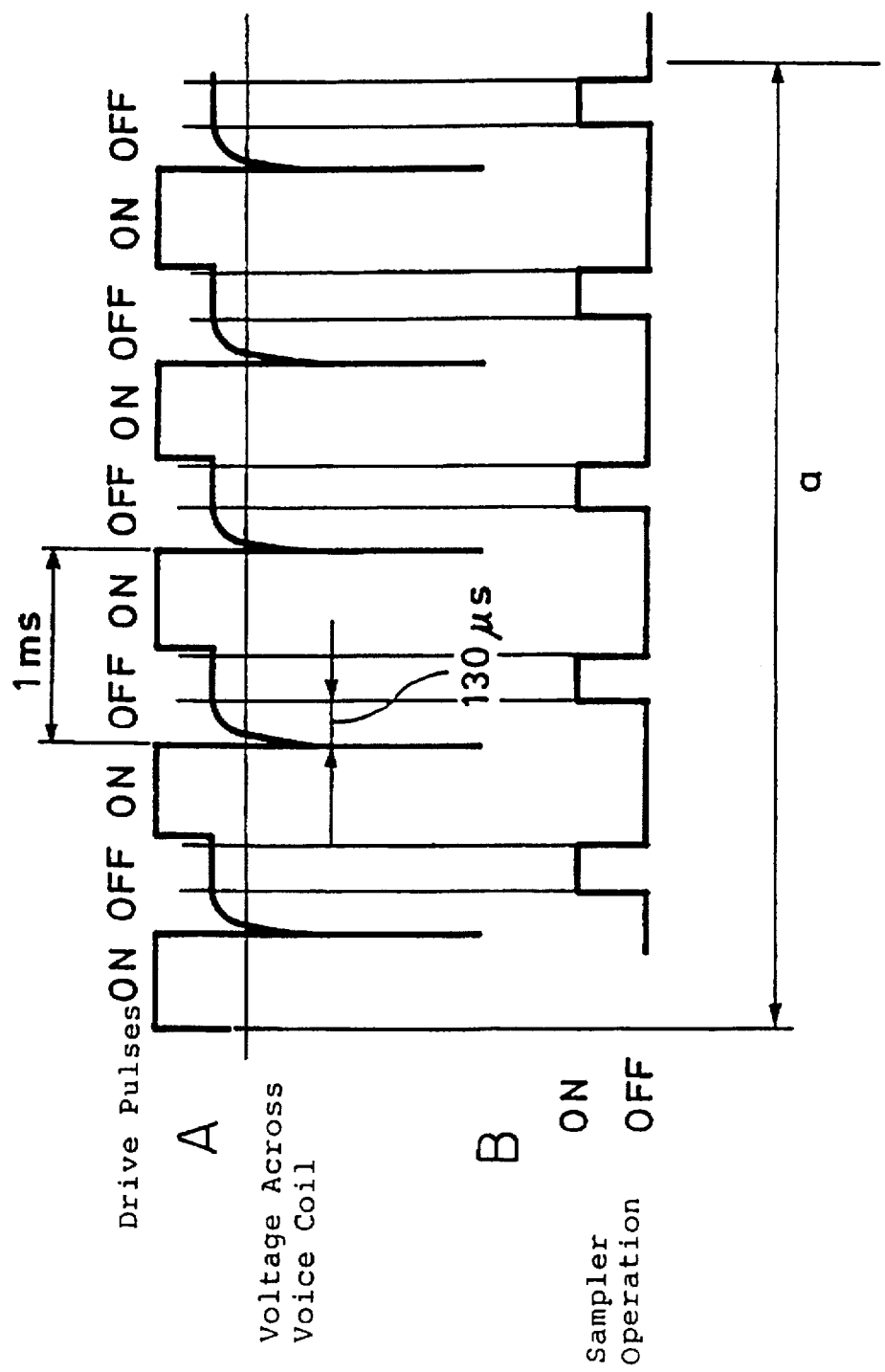
FIG. 7 is a diagram showing a voltage across a voice coil and operation of a sample-and-hold circuit in the magnetic disk device shown in FIG. 5.

FIG. 7 shows a voltage generated across the voice coil 8. FIG. 6B shows at enlarged scale a portion of the time "a" in FIG. 7.

When the drive voltage is on, the drive voltage itself appears. When the drive voltage is off, a counterelectromotive force appears which is proportional to the angular velocity of the actuator 3.

Because of the inductance L of the voice coil 8, the counterelectromotive force cannot accurately be observed for about 130 μs after the drive voltage has been turned off. Therefore, the sampler 12a starts to be turned on 130 μs after the drive voltage has started to be turned off as shown in FIG. 7.

In view of the timing to turn the sampler 12a on, the drive voltage for driving the actuator 3 has a frequency selected as follows:

If the resistance component of a time constant of the voice coil 8 is represented by R and the inductance component thereof by L, then the frequency f of the drive voltage is required to meet the relation: $f < R/2L$.

If the drive voltage frequency exceeded the condition given by the above inequality, then the counterelectromotive force could not be observed and supplied.

Figure 8A:
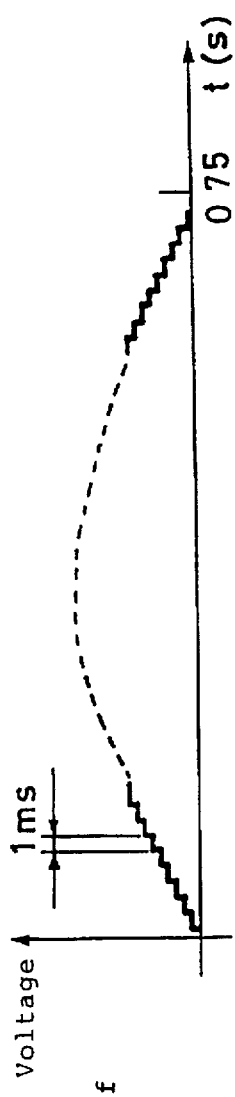
FIGS. 8A, 8B, and 8C are timing charts showing respective output signals from the sample-and-hold circuit, a speed voltage averaging circuit, and an integrating circuit in the magnetic disk device shown in FIG. 5.
Figure 8B:
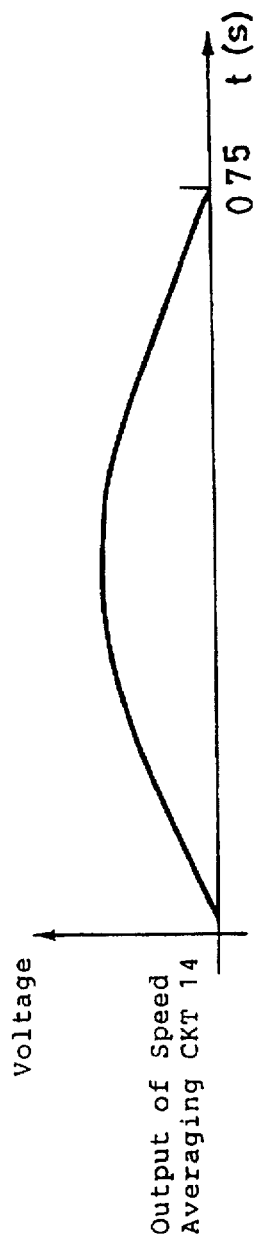
Figure 8C:
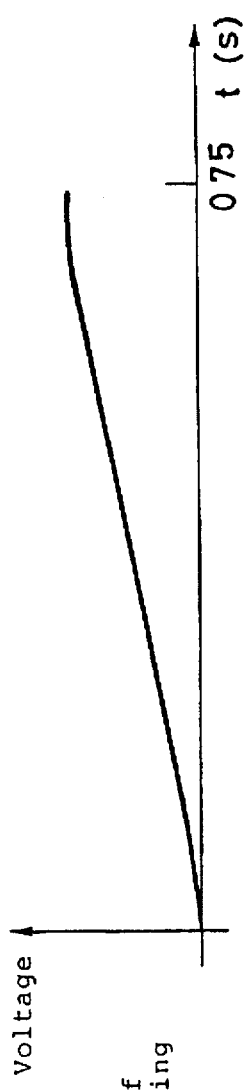

The counterelectromotive force which is observed by the sample-and-hold circuit 12 is outputted as a speed voltage as shown in FIG. 8A from the holder 12b. Then, the speed voltage is averaged as shown in FIG. 8B by the speed voltage averaging circuit 13, and then converted into a positional voltage as shown in FIG. 8C by the integrating circuit 15. The positional voltage is then applied to the control circuit 14.

In this manner, a position loop is established. The speed voltage averaging circuit 13 is composed of a low-pass filter of second order, for example. However, the speed voltage averaging circuit 13 may be arranged to determine a simple average rather than the moving average.

Figure 9:
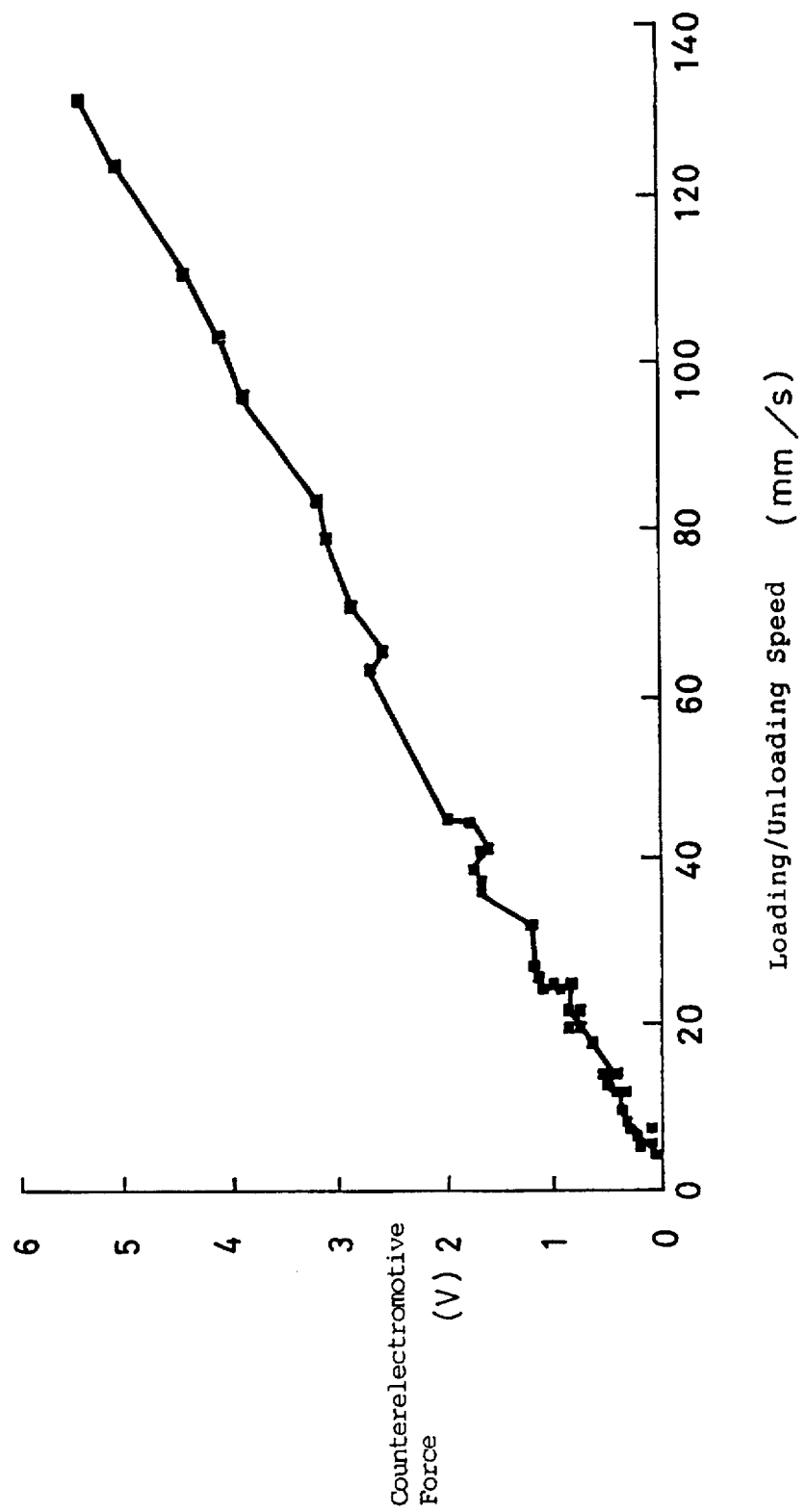
FIG. 9 is a graph showing the relationship between a speed of vertical movement of a head slider with respect to the surface of a magnetic disk and an amplified counter-electromotive force in the magnetic disk device shown in FIG. 5.
Figure 10:
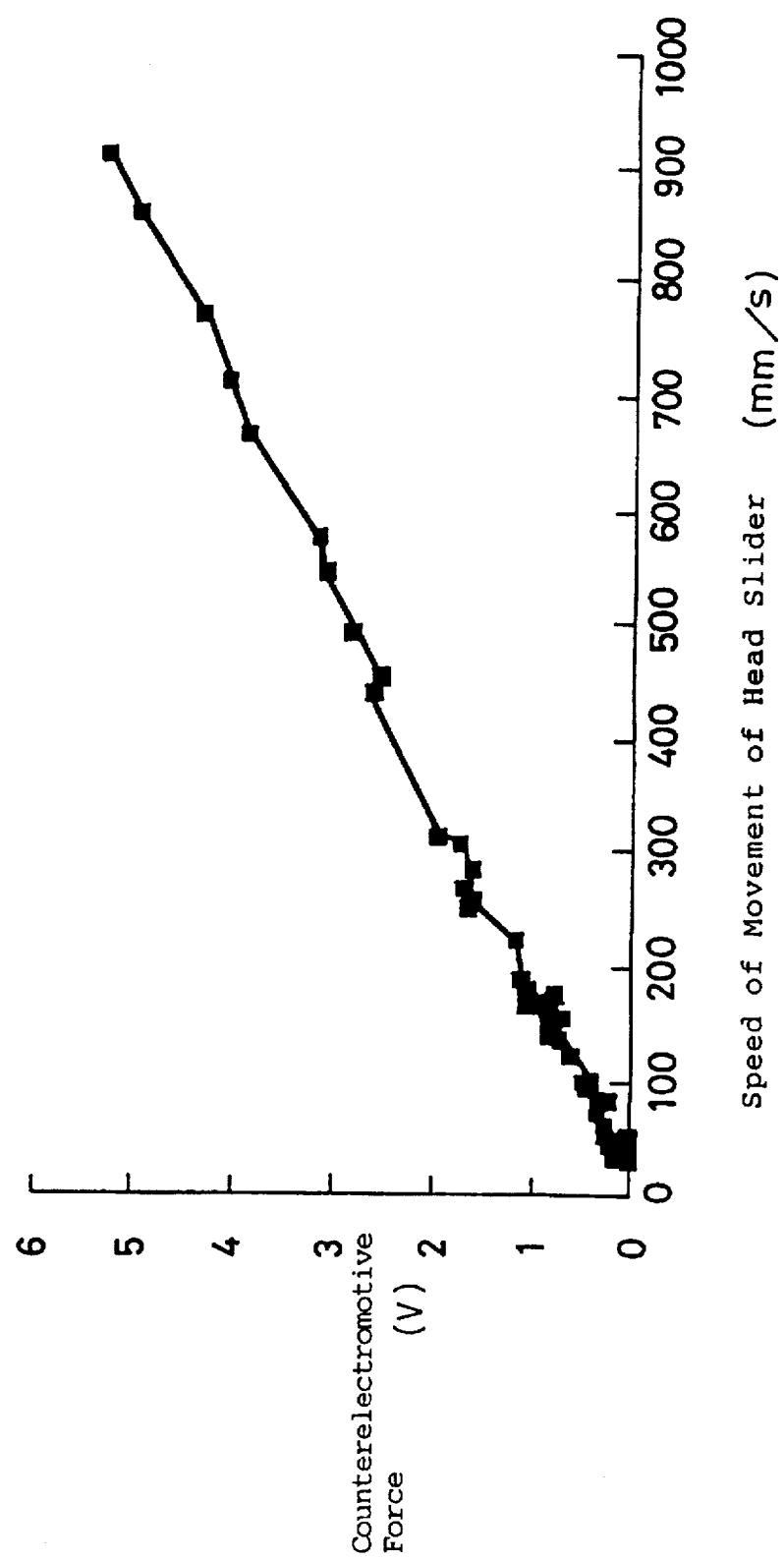
FIG. 10 is a graph showing the relationship between a speed of horizontal movement of the head slider with respect to the surface of the magnetic disk and the amplified counterelectromotive force in the magnetic disk device shown in FIG. 5.

FIG. 9 shows the relationship between the counterelectromotive force (represented by the vertical axis) and the speed of vertical movement (represented by the horizontal axis) of the head slider 7 with respect to the surface of the magnetic disk 2. The counterelectromotive force is amplified at a suitable gain (about 100 times). FIG. 10 shows the relationship between the counterelectromotive force (represented by the vertical axis) and the speed of horizontal movement of the head slider 7 with respect to the surface of the magnetic disk 2.

The speed of vertical movement of the head slider 7 with respect to the surface of the magnetic disk 2 is determined uniquely from the angular velocity of the actuator 3 once the angle of inclination of the cam surface 9b of the cam 9 and the distance from the rotational shaft 4 to the head slider 7 are determined. The actuator 3 is controlled such that the speed of movement of the head slider along the surface of the magnetic disk is 140 mm/s or less, for example, so that the speed of vertical movement of the head slider 7 is 20 mm/s or less.

The angle of inclination of the cam 9 to the surface of the magnetic disk 2 is about 5.7 degrees, and the distance from the rotational shaft 4 to the head slider 7 is about 40 mm. Since the counterelectromotive force is proportional to the angular velocity of the actuator 3, the speed of movement of the head slider 7 along the surface of the magnetic disk 2 is also proportional to the counterelectromotive force.

If the speed of movement of the head slider 7 along the surface of the magnetic disk is 140 mm/s, for example, then the corresponding amplified counterelectromotive force is about 1 V. The speed voltage is applied to the integrating circuit 15, which converts the speed voltage into a positional voltage.

The speed voltage and the positional voltage are then fed back to the control circuit 14, and compared with positional voltage information having a desired profile which is established in the reference value table 16 and that varies from time to time. Depending on the result of the comparison, the voltages are outputted as an analog drive voltage from the control circuit 14. While the reference value table contains positional voltages in the illustrated embodiment, it may contain speed voltage information having a desired profile that varies from time to time.

The analog drive voltage is applied to the actuator driver circuit 11, and varies the duty ratio of pulses produced thereby to energize the actuator 3 to move the head slider 7 at a speed of 140 mm/s or less along the surface of the magnetic disk 2 when the head slider 7 is loaded or unloaded.

As a consequence, the head slider 7 is prevented from colliding with the surface of the magnetic disk 2 with relatively large shocks, and can be loaded and unloaded very safely.

To indicate the end of a loading operation, the time that has elapsed from the start of the loading operation may be measured by the timer 11a, and a mark indicative of the end of the loading operation may be delivered to an external circuit 1 second after the end of the loading operation. Furthermore, to indicate the end of an unloading operation, the time that has elapsed from the start of the unloading operation may be measured by the timer 11a, and a mark indicative of the end of the unloading operation may be delivered to an external circuit 1 second after the end of the unloading operation.

Preferably, the head slider 7 should be arranged to be loaded and unloaded into a position in an outer circumferential region of the magnetic disk 2, i.e., a position determined by $r1 < \theta < r2$ ($r1$, $r2$ are constants where $r1 < r2$) and $\theta1 < r < \theta2$ ($\theta1$, $\theta2$ are constants where $\theta1 < \theta2$) where r represents a position in the radial direction of the magnetic disk and $\theta$ represents a position in the circumferential direction of the magnetic disk.

To provide against a collision of the head slider 7 with the magnetic disk 2 even under the above control, no important information is recorded in the above position on the magnetic disk 2.

The value of $\theta$ may be determined, for example, from a detected phase of an FG (frequency generator) magnet mounted in the spindle motor which rotates the magnetic disk 2.

The detected phase of the FG magnet may be given as a starting trigger (FIG. 5) to the reference value table.

The values of r1, r2 may be determined by selecting preferred positions in designing the disk.

With the above arrangement, even if the head slider 7 collides with the magnetic disk 2, important information that is recorded is prevented from being destroyed, and hence the head slider can safely be loaded, unloaded, and retracted.

Figure 11:
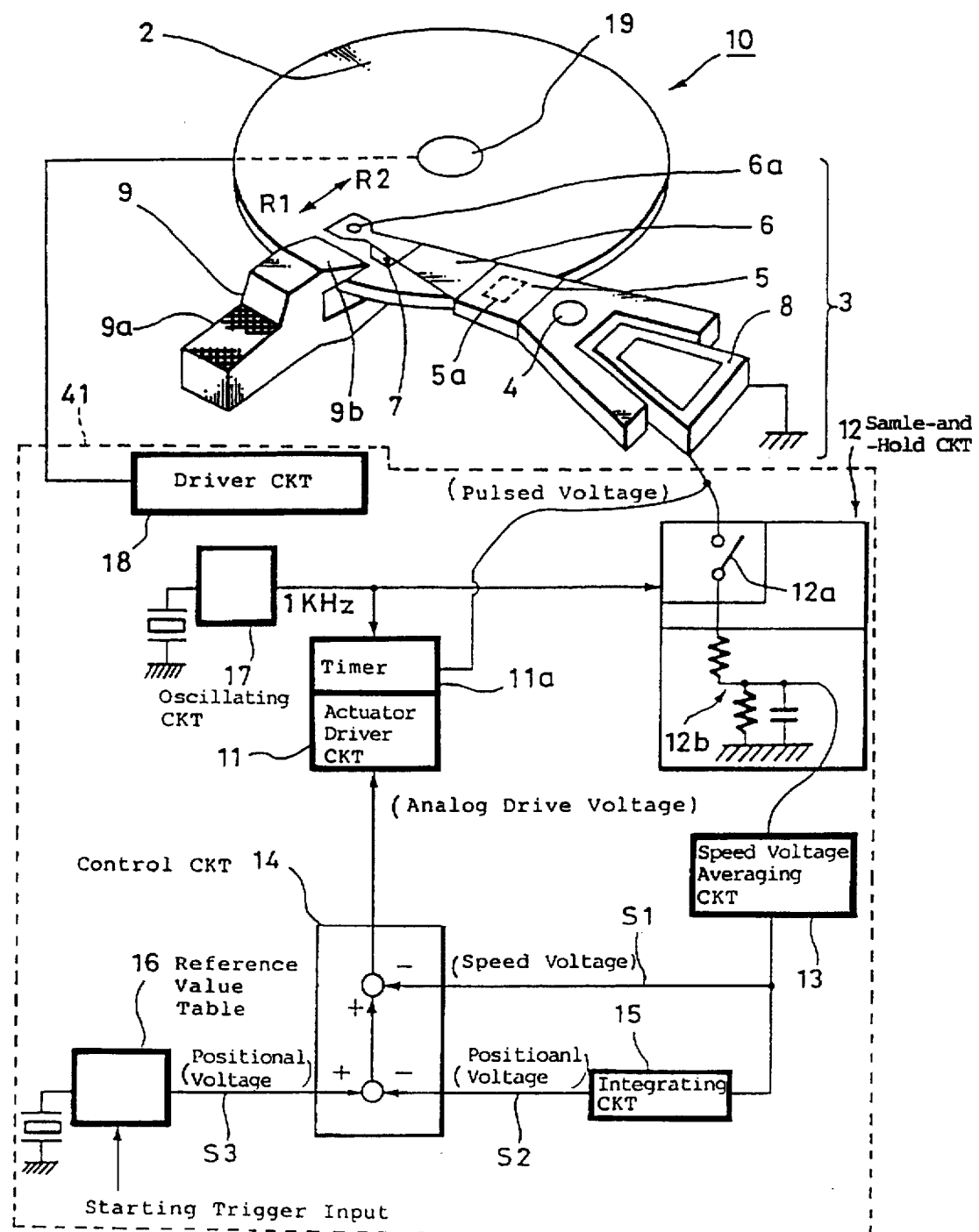
FIG. 11 is a view of a magnetic disk device which incorporates a loading and unloading apparatus according to a second embodiment of the present invention.

FIG. 11 shows a magnetic disk device which incorporates a loading and unloading apparatus according to a second embodiment of the present invention.

Those parts of the magnetic disk device shown in FIG. 11 which are identical to those shown in FIG. 5 are denoted by identical reference numerals, and will not be described in detail below.

In FIG. 11, the magnetic disk device according to the second embodiment differs from the magnetic disk device according to the first embodiment in that the drive control means for the actuator 3 is constructed as a drive control circuit 41 integrated on one board.

The first drive control circuit 41 preferably includes the driver circuit 18 for energizing the motor 19 to rotate the magnetic disk 2.

The second embodiment operates in the same manner and offers the same advantages as the first embodiment.

Figure 12:
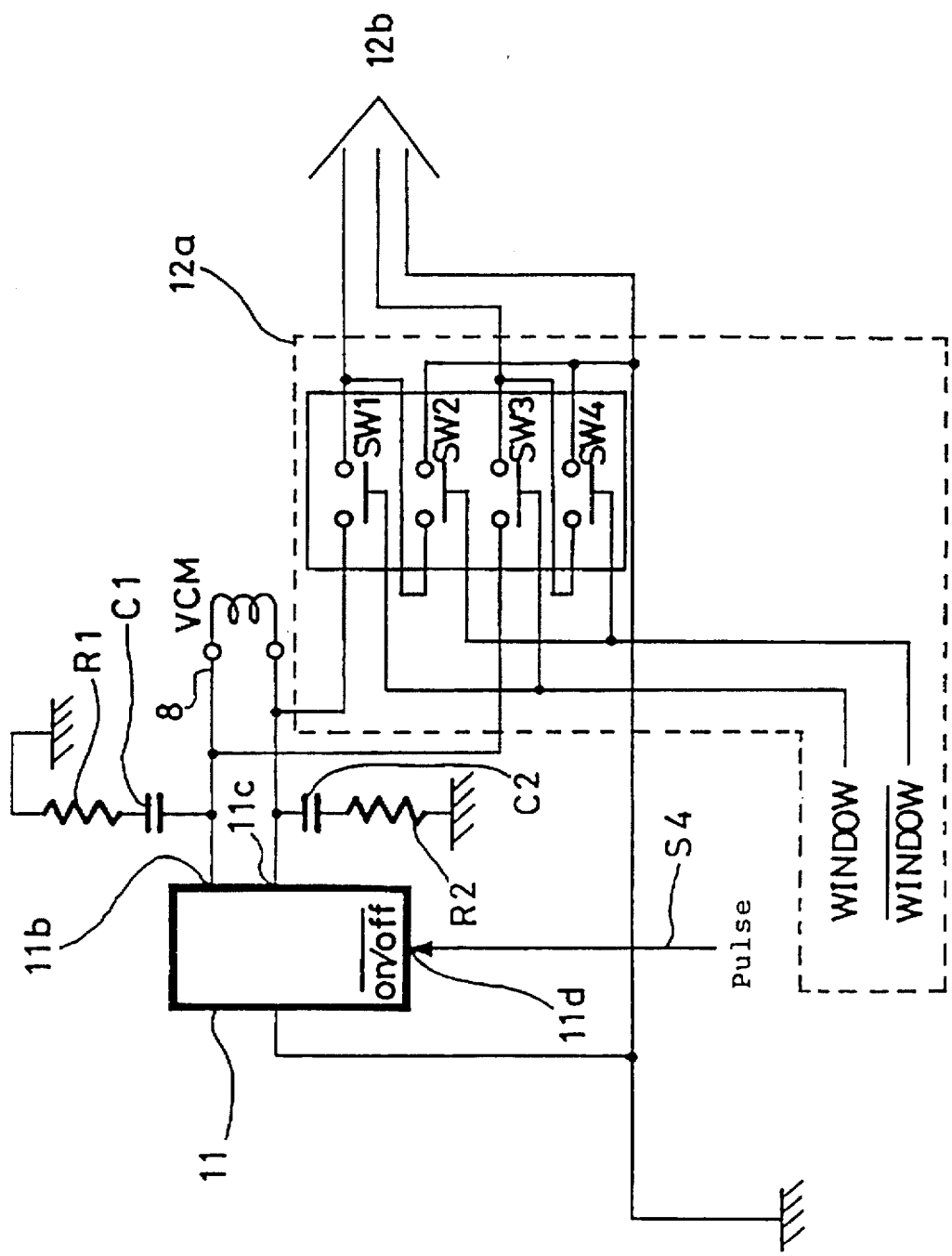
FIG. 12 is a circuit diagram of a sampling circuit according to a first arrangement in a drive control circuit shown in FIG. 11.

The sample-and-hold circuit 12 has a switching arrangement which is specifically constructed as shown in FIG. 12.

In FIG. 12, a drive pulse S4 from the oscillating circuit 17 is applied to an inverted on/off terminal 11d of the actuator driver circuit 11.

The sampler 12a has four switches SW1, SW2, SW3, SW4 which are preferably composed of MOS-FETs for effecting switching operation with a low power requirement.

The switches SW1, SW2, SW3, SW4 may instead be ordinary analog switches.

A WINDOW output signal for turning on the switches of the sampler 12a is supplied to control terminals of the switches SW1, SW3, and an inverted WINDOW output signal is supplied to control terminals of the switches SW2, SW4.

The voice coil 8 has a terminal connected to an output terminal 11c of the actuator driver circuit 11 and also to the holder 12b through terminals of the switch SW1. To the terminal of the voice coil 8, there are connected a capacitor C2 and a resistor R2. The other terminal of the voice coil 8 is connected to an output terminal 11b of the actuator driver circuit 11 and also to the holder 12b through terminals of the switch SW3. To the other terminal of the voice coil 8, there are connected a capacitor C1 and a resistor R1.

The switch SW2 can ground or open the terminal of the switch SW1 which is connected to the holder 12b. The switch SW4 can ground or open the terminal of the switch SW2 which is connected to the holder 12b.

The inverted on/off terminal 11d of the actuator driver circuit 11 is a control terminal which operates such that the actuator driver circuit 11 applies a drive signal to the voice coil 8 when the drive pulse S4 applied from the oscillating circuit 17 to the inverted on/off terminal 11d of the actuator driver circuit 11 is L (low), and the actuator driver circuit 11 stops energizing the voice coil 8 when the drive pulse S4 applied from the oscillating circuit 17 to the inverted on/off terminal 11d of the actuator driver circuit 11 is H (high).

Figure 13:
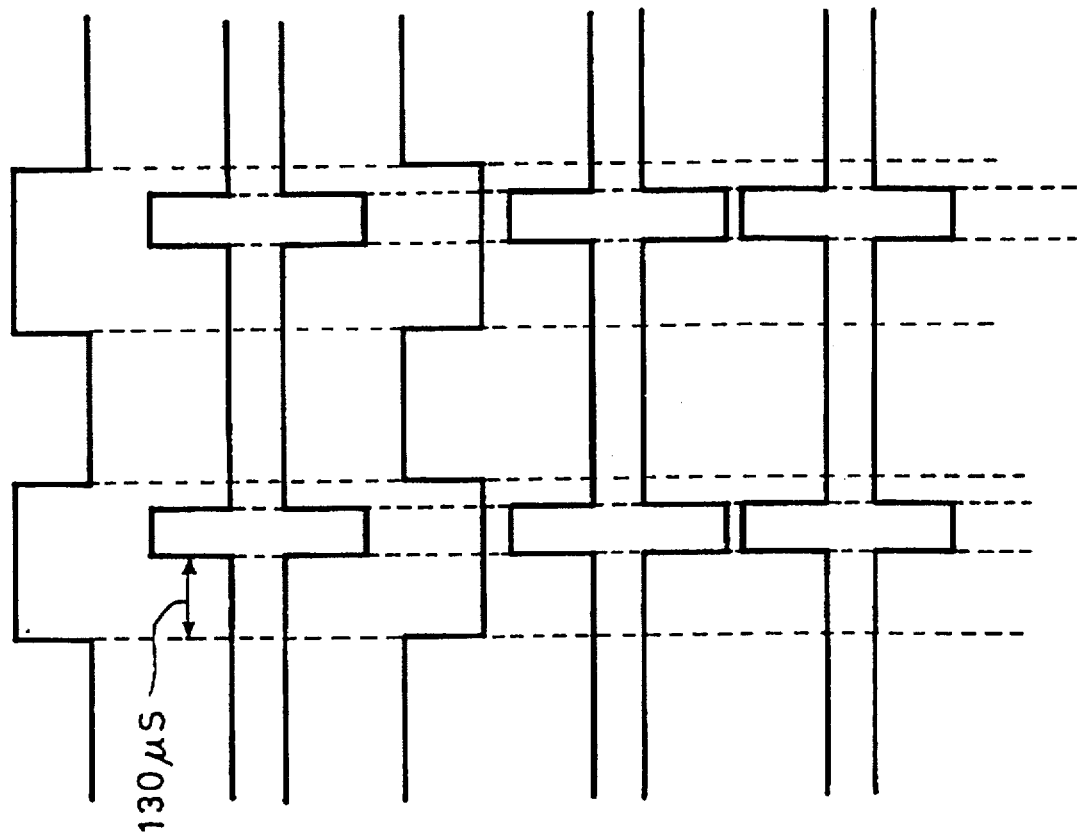
FIG. 13 is a timing chart showing operation of the sampling circuit in the drive control circuit shown in FIG. 11.

Operation of the switching circuit shown in FIG. 12 will be described below with reference to a timing chart of FIG. 13.

When the drive pulse S4 is L and the WINDOW output signal is L (the inverted WINDOW output signal is H), the voice coil is turned on, the switches SW1, SW3 off, and the switches SW2, SW4 on. At this time, input terminals of the holder 12b are of GND (ground) level. Now, zero-point calibration can be effected for a first-stage amplifier of the holder 12b.

When the drive pulse S4 is H and the WINDOW output signal is L (the inverted WINDOW output signal is H), VCM output terminals of the actuator driver circuit 11 are open, and the voice coil is turned off, the switch SW1 off, the switch SW2 on, the switch SW3 off, the switch SW4 on. At this time, the input terminals of the holder 12b are grounded.

Upon elapse of 130 microseconds after the drive pulse S4 has become H, the WINDOW output signal is H (the inverted WINDOW output signal is L), the switch SW1 is turned on, the switch SW2 off, the switch SW3 on, and the switch SW4 off. A counterelectromotive force is applied from the terminals of the voice coil 8 which are connected to the switches SW1, SW3 to the holder 12b.

Figure 14:
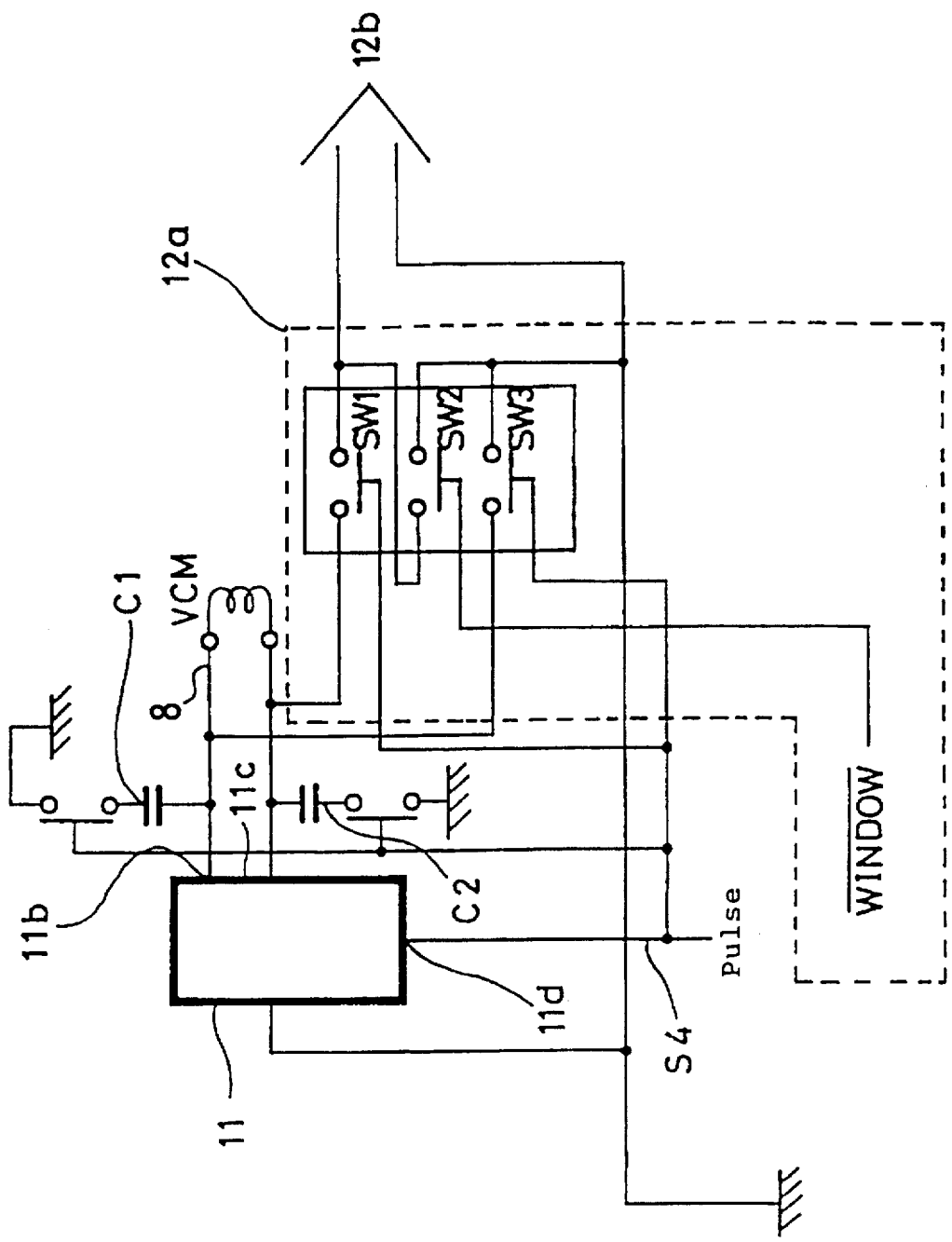
FIG. 14 is a circuit diagram of a sampling circuit according to a second arrangement in the drive control circuit shown in FIG. 11.

FIG. 14 shows an improvement of the switching arrangement shown in FIG. 12.

In FIG. 14, resistive components required at the opposite terminals of the voice coil 8 for preventing it from oscillating are given by switch resistances, rather than the resistors R1, R2 shown in FIG. 12. This is effective in preventing the oscillation-preventing capacitors C1, C2 from affecting an off-interval of the drive pulse S4.

The specific switching arrangement shown in FIG. 14 is the same as a switching arrangement shown in FIG. 15, which will be described below.

Figure 15:
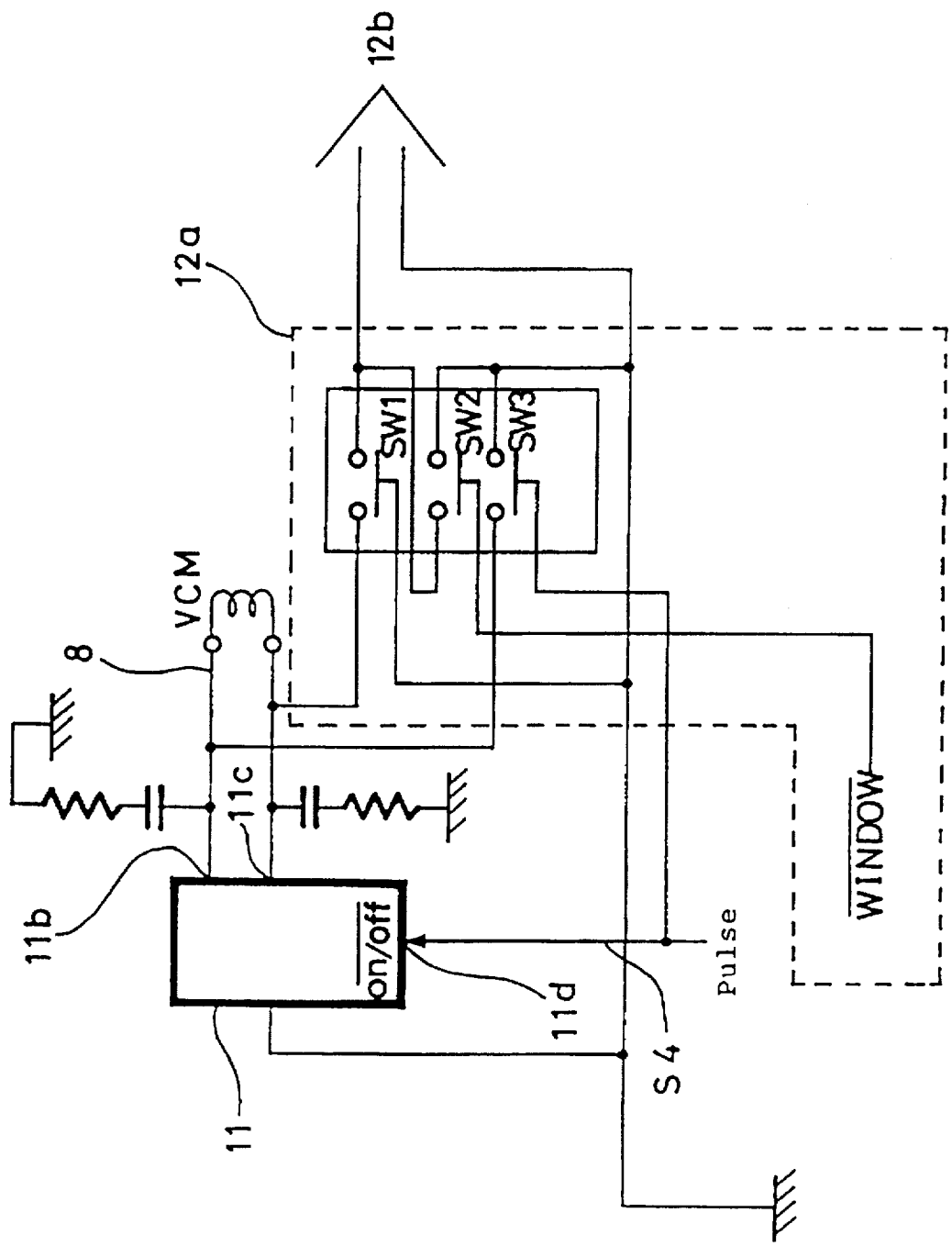
FIG. 15 is a circuit diagram of a sampling circuit according to a third arrangement in a drive control circuit shown in FIG. 11.

FIG. 15 shows another switching arrangement for the sample-and-hold circuit 12.

In the arrangement shown in FIG. 15, the terminals of the voice coil 8 are grounded in 130 microseconds after the start of an off-interval of the drive voltage for quickly draining electric charges remaining in the voice coil 8.

Specifically, the drive pulse S4 is supplied to the inverted on/off terminal 11d of the actuator driver circuit 11 and the control terminals of the switches SW1, SW3 of the sampler 12a. The inverted WINDOW output signal is supplied to the control terminal of the switch SW2. The terminal of the voice coil 8 which is connected to the output terminal 11c of the actuator driver circuit 11 is connected to the holder 12b through the switch SW1. The switch SW2 can short-circuit or open the terminals of the switches SW1, SW3 which are connected to the holder 12b. The inverted on/off terminal 11d of the actuator driver circuit 11 is a control terminal which operates such that when the drive pulse S4 is LOW (L), the actuator driver circuit 11 applies a drive signal to the voice coil 8, and when the drive pulse S4 is HIGH (H), the actuator driver circuit 11 stops applying a drive signal to the voice coil 8.

Figure 16:
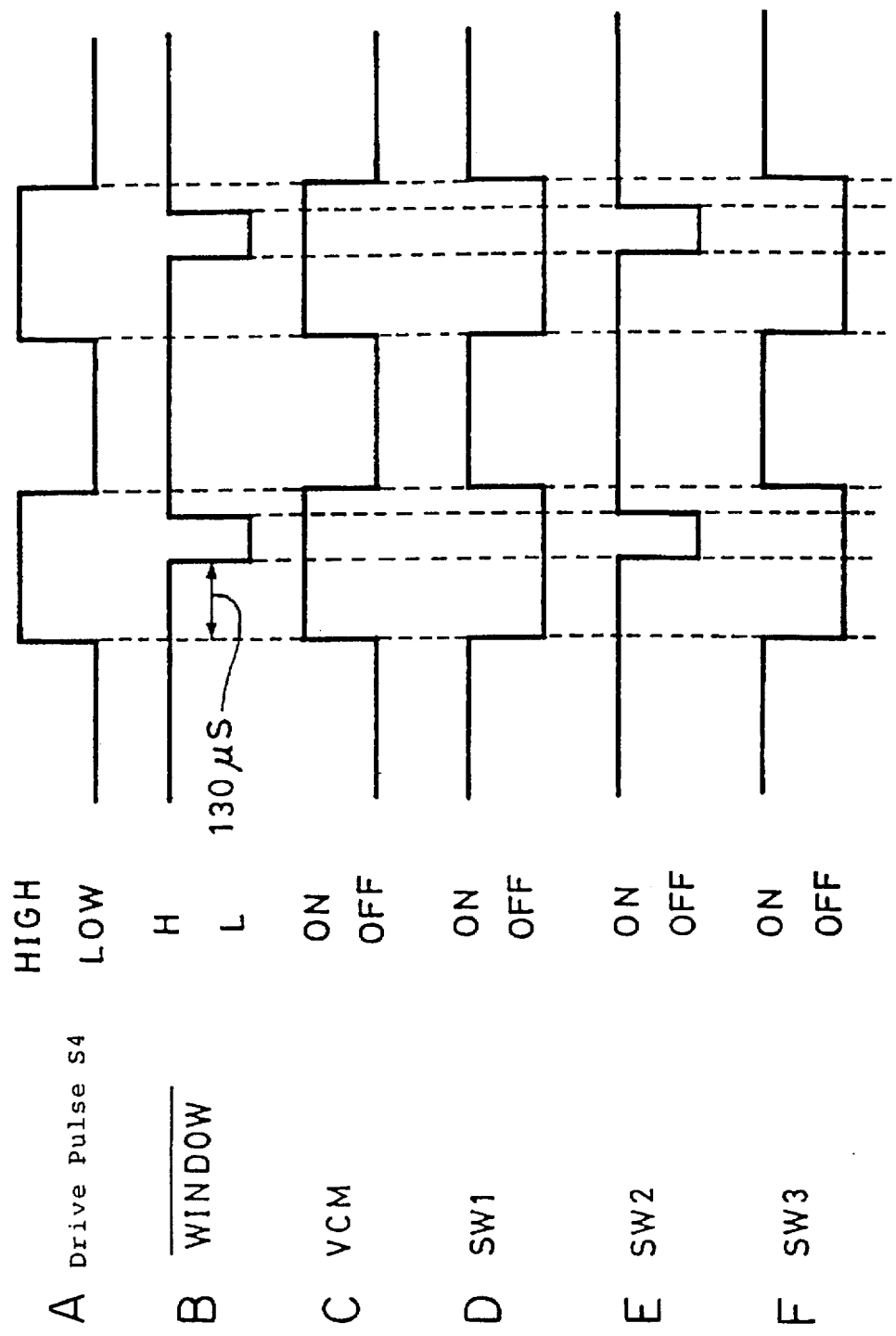
FIG. 16 is a timing chart showing operation of the sampling circuit shown in FIG. 15.

Operation of the switching circuit shown in FIG. 15 will be described below with reference to a timing chart of FIG. 16.

When the drive pulse S4 is L and the inverted WINDOW output signal is H, the voice coil 8 is turned on, the switches SW1, SW3 off, and the switch SW2 on.

At this time, input terminals of the holder 12b are of GND (ground) level. Now, zero-point calibration can be effected for a first-stage amplifier of the holder 12b.

When the drive pulse S4 is H and the inverted WINDOW output signal is H, voice coil output terminals of the actuator driver circuit 11 are open, and the voice coil 8 is turned off, the switches SW1, SW3 on, and the switch SW2 on. The terminals of the voice coil 8 are grounded, and the input terminals of the holder 12b are grounded.

Upon elapse of 130 microseconds after the drive pulse S4 has become H, the inverted WINDOW output signal is L, the switch SW1 is turned on, the switch SW3 on, and the switch SW2 off. A counterelectromotive force is applied from the voice coil terminals connected to the switch SW1 to the holder 12b.

Figure 17:
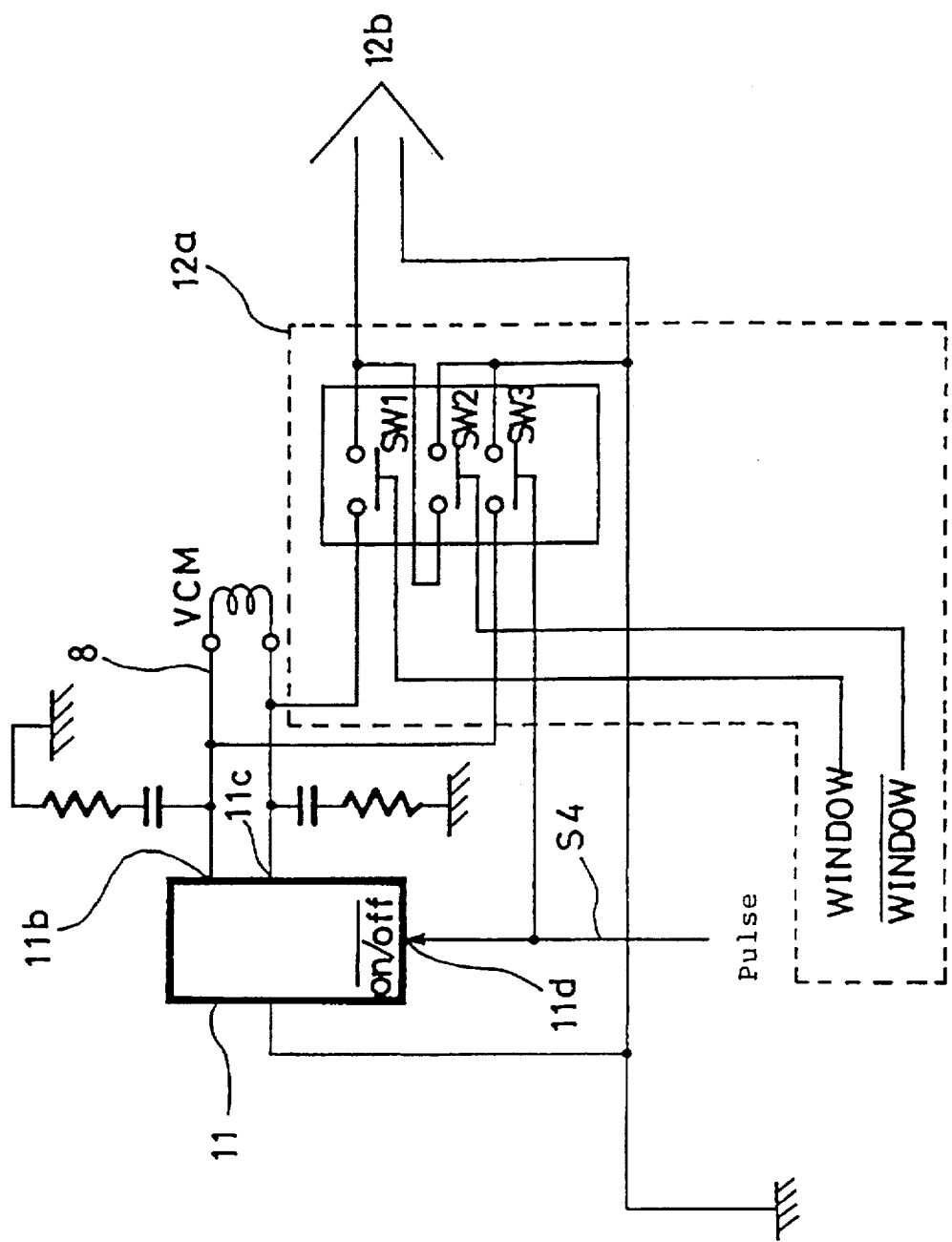
FIG. 17 is a circuit diagram of a sampling circuit according to a fourth arrangement in a drive control circuit shown in FIG. 11.

FIG. 17 shows still another switching arrangement for the sample-and-hold circuit 12.

In the arrangement shown in FIG. 17, one of the terminals of the voice coil 8 is grounded in 130 microseconds after the start of an off-interval of the drive voltage for quickly draining electric charges remaining in the voice coil 8.

Specifically, the drive pulse S4 is supplied to the inverted on/off terminal 11d of the actuator driver circuit 11 and the control terminal of the switch SW3 of the sampler 12a. The WINDOW output signal is supplied to the control terminal of the switch SW1, and the inverted WINDOW output signal is supplied to the control terminal of the switch SW2. The terminal of the voice coil 8 which is connected to the output terminal 11c of the actuator driver circuit 11 is connected to the holder 12b through the switch SW1. The other terminal of the voice coil 8 is grounded and connected to the holder 12b.

The switch SW2 can short-circuit or open the terminals of the switches SW1, SW3 which are connected to the holder 12b. The inverted on/off terminal 11d of the actuator driver circuit 11 is a control terminal which operates such that when the drive pulse S4 is LOW (L), the actuator driver circuit 11 applies a drive signal to the voice coil 8, and when the drive pulse S4 is HIGH (H), the actuator driver circuit 11 stops applying a drive signal to the voice coil 8.

Figure 18:
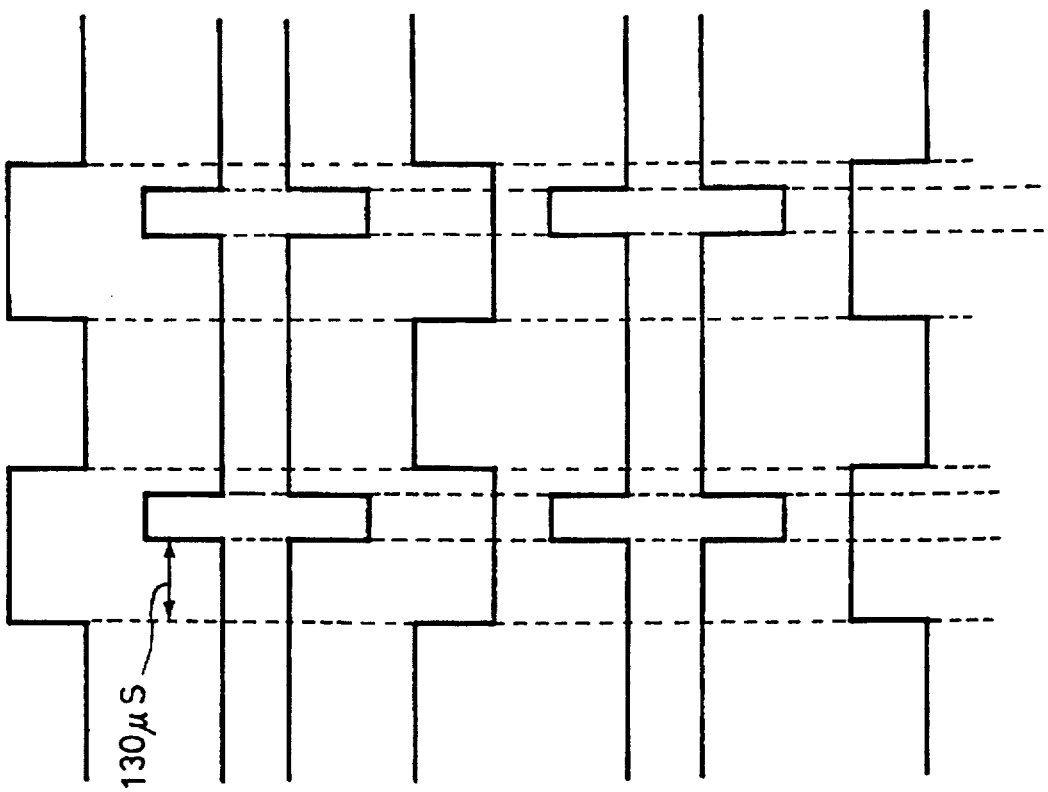
FIG. 18 is a timing chart showing operation of the sampling circuit shown in FIG. 17.

Operation of the switching circuit shown in FIG. 17 will be described below with reference to a timing chart of FIG. 18.

When the drive pulse S4 is L and the WINDOW output signal is L (the inverted WINDOW output signal is H), the voice coil 8 is turned on, the switches SW1, SW3 off, and the switch SW2 on.

At this time, input terminals of the holder 12b are of GND (ground) level. Now, zero-point calibration can be effected for a first-stage amplifier of the holder 12b.

When the drive pulse S4 is H and the WINDOW output signal is L (the inverted WINDOW output signal is H), voice coil output terminals of the actuator driver circuit 11 are open, and the voice coil 8 is turned off, the switches SW1, SW3 off, and the switch SW2 on. One of the terminals of the voice coil 8 is grounded, and the input terminals of the holder 12b are grounded.

Upon elapse of 130 microseconds after the drive pulse S4 has become H, the WINDOW output signal is H (the inverted WINDOW output signal is L), the switch SW1 is turned on, the switch SW2 off, and the switch SW3 on. A counterelectromotive force is applied from the voice coil terminals connected to the switch SW1 to the holder 12b.

Figure 19:
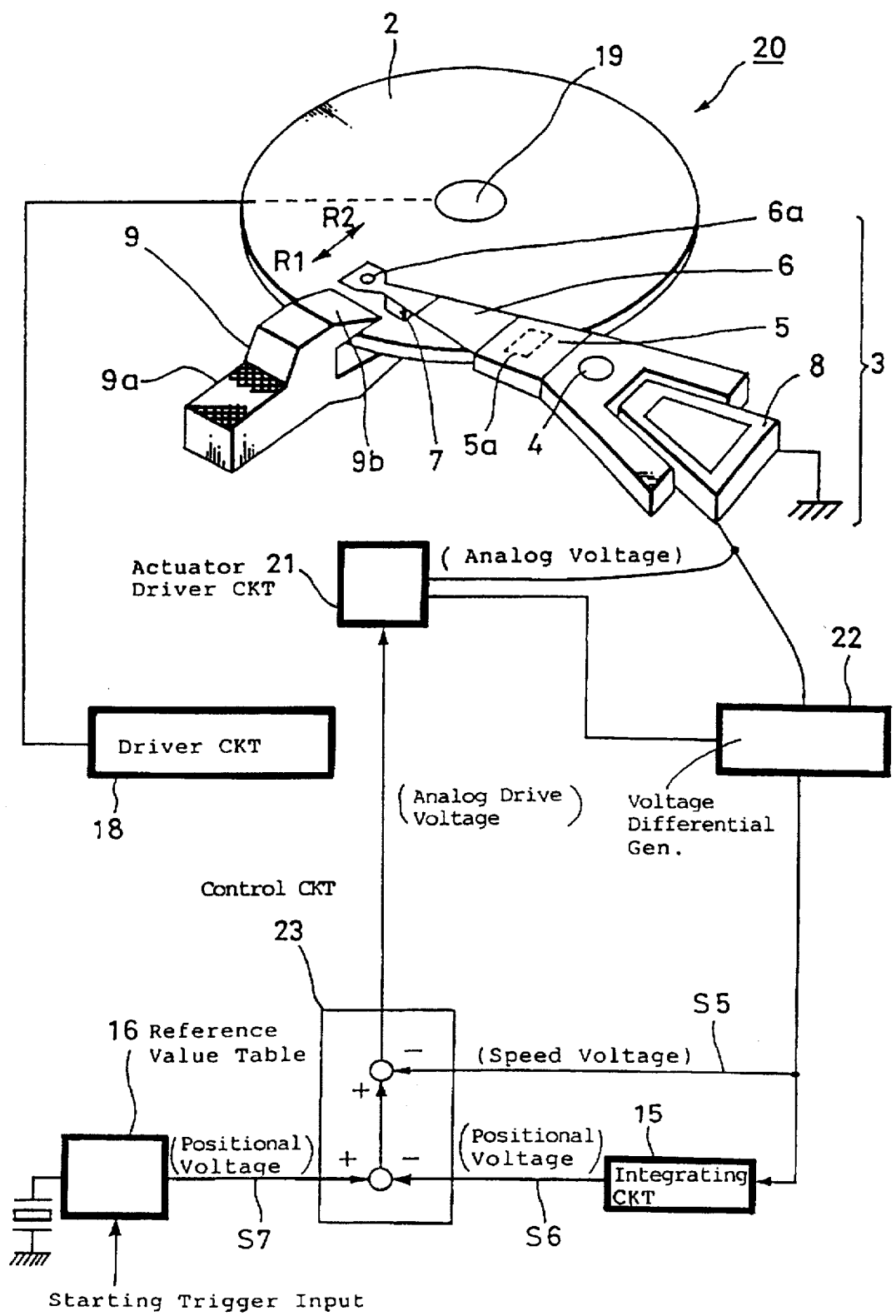
FIG. 19 is a view of a magnetic disk device which incorporates a loading and unloading apparatus according to a third embodiment of the present invention.

FIG. 19 shows a magnetic disk device which incorporates a loading and unloading apparatus according to a third embodiment of the present invention.

A magnetic disk device 20 shown in FIG. 19 differs from the magnetic disk device shown in FIG. 5 in that an actuator driver circuit 21 is employed in place of the actuator driver circuit 11 and the oscillating circuit 17, a voltage differential generator 22 is employed in place of the sample-and-hold circuit 12 and the speed voltage averaging circuit 13, and a control circuit 23 is employed in place of the control circuit 14.

In the arrangement shown in FIG. 19, the actuator driver circuit 21 applies drive pulses which have a fixed duty ratio of 50% to the actuator 3, and the rotational speed of the actuator 3 is controlled by adjusting the voltage of the drive pulses of the actuator driver circuit 21.

FIGS. 20A, 20B, and 20C show time-dependent waveforms of elements produced as the actuator 3 operates.

In FIGS. 20A, 20B, and 20C, one loading or unloading (retracting) cycle takes about 0.75 second. FIG. 20A shows the rotational angle of the actuator 3, and FIG. 20B shows the angular velocity of the actuator 3. FIG. 20C shows the drive voltage of the actuator driver circuit 21. In this case, simple rectangular-wave control is carried out.

The voltage as shown in FIG. 21A is generated across the voice coil 8. The voltage across the voice coil 8 varies with respect to the drive voltage indicated by the dotted lines due to a counterelectromotive force.

Based on the difference between the drive voltage of the actuator driver circuit 21 and the voltage across the voice coil 8, the voltage differential generator 22 extracts a counterelectromotive force proportional to the angular velocity of the actuator 3 as shown in FIG. 21B. The counterelectromotive force is then converted by the integrating circuit 15 into a positional voltage as shown in FIG. 21C, and the positional voltage is then applied to the control circuit 23. Thus, speed and position loops are established.

Figure 22:
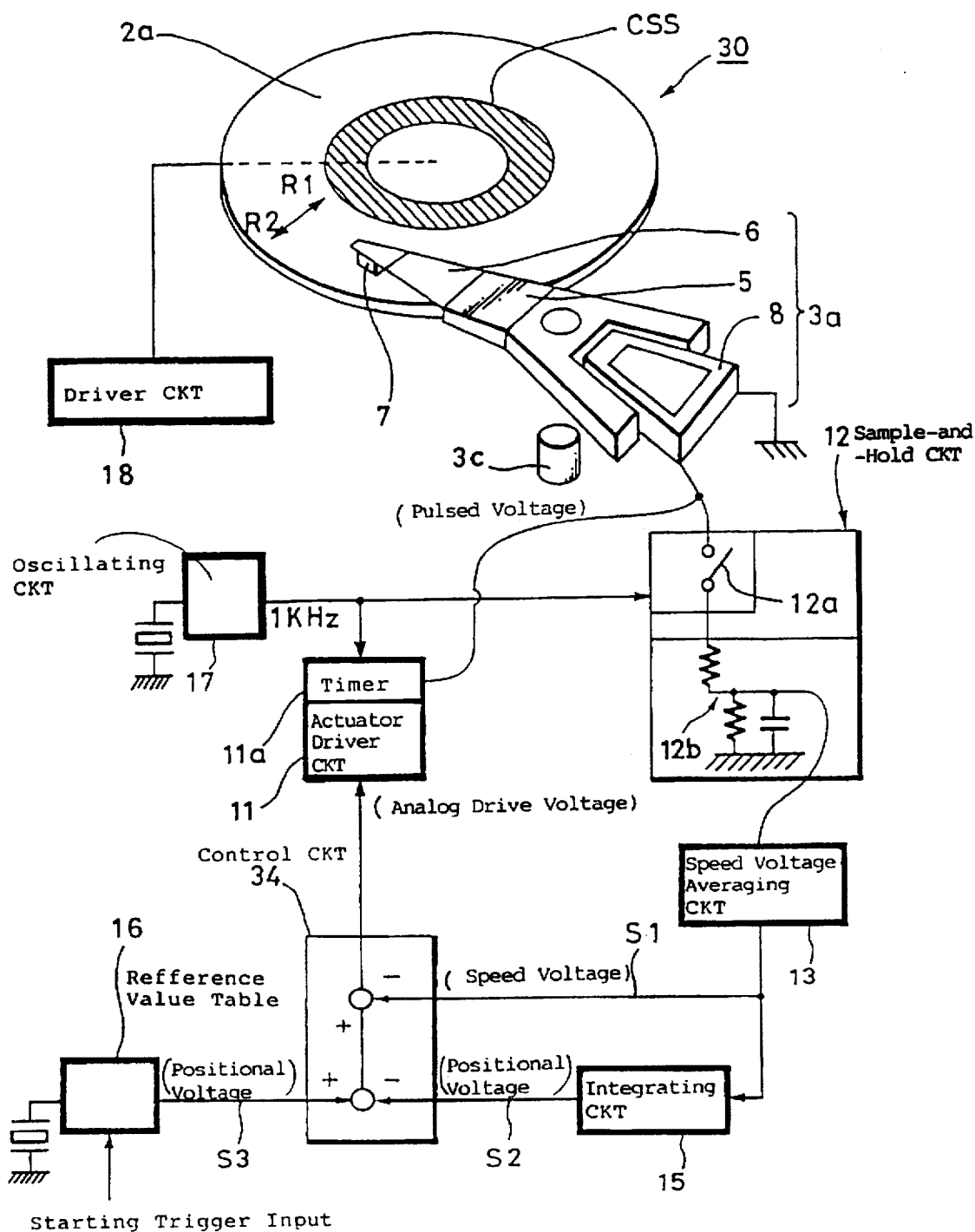
FIG. 22 is a view of a magnetic disk device which incorporates a loading and unloading apparatus according to a fourth embodiment of the present invention.

FIG. 22 shows a magnetic disk device which incorporates a loading and unloading apparatus according to a fourth embodiment of the present invention.

In FIG. 22, a magnetic disk device 30 is of a contact start-stop (CSS) configuration.

Generally, the CSS system makes it possible to control the speed based on surface information of the disk when the head slider is loaded. Therefore, it is not necessary to control the speed of the actuator using the counterelectromotive force of the voice coil.

Consequently, where the principles of the present invention are applied to a magnetic disk device of the CSS type, they are used to control the speed of the actuator to retract the head slider primarily in case of emergency such as a power failure.

However, if surface information is not recorded in a given area on the disk in a magnetic disk device of the CSS type, then the principles of the present invention are applicable to control the speed of the actuator when the head slider is loaded or unloaded.

In FIG. 22, the magnetic disk device 30 includes a magnetic disk 2a which can be rotated and an actuator 3a which supports a head slider for movement in a slightly floating condition radially over the surface of the magnetic disk 2a.

The actuator 3 comprises an arm 5 supported for rotation about a rotational shaft 4, a head slider 7 supported on a distal end of the arm 5 by a suspension 6, and a voice coil 8 for rotating the arm 5 about the rotational shaft 4.

The magnetic disk device 30 has a CSS zone CSS disposed in a radially inner region of the magnetic disk 2a, the retraction area being outside of a data area. The CSS zone CSS forms a retraction area when the head slider 7 is retracted, in a location where the head slider 7 is floated off the magnetic disk 2a when the magnetic disk device 30 is started or stopped. The magnetic disk device 30 also has a stopper 3c for mechanically stopping operation of the actuator 3a to stop movement of the head slider 7 radially inwardly of the magnetic disk 2a at the CSS zone CSS.

The above structure of the magnetic disk device 30 is the same as the conventional magnetic disk device 1a of the CSS type. According to the fourth embodiment, the voice coil 8 is energized in a PWM mode by an actuator driver circuit 11 and is connected to a sample-and-hold circuit 12.

The magnetic disk 2a can be rotated by a motor 19. The magnetic disk device 30 has a driver circuit 18 for energizing the motor 19 to rotate the magnetic disk 2a.

Preferably, the actuator driver circuit 11 has a timer 11a for generating a timing signal to end a retracting process.

An output signal from the sample-and-hold circuit 12 is averaged by a speed voltage averaging circuit 13, which applies its output signal as a speed voltage S1 directly to a control circuit 34.

More preferably, the output signal from the sample-and-hold circuit 12 is supplied through the speed voltage averaging circuit 13 to an integrating circuit 15, which applies its output signal as a positional voltage S2 to the control circuit 34. The control circuit 34 is supplied with a reference positional voltage S3 from a reference value table 16.

An oscillating circuit 17 applies a signal having a frequency of 1 kHz, for example, to the actuator driver circuit 11. The control circuit 14 also applies its output signal to the actuator driver circuit 11. The signal from the oscillating circuit 17 is also supplied to the sample-and-hold circuit 12 for use as a timing clock signal for sampling and holding the counterelectromotive force produced by the voice coil 8.

The actuator driver circuit 11 generates a pulsed voltage having a frequency of 1 kHz and an amplitude of 0.5 V based on the signal from the oscillating circuit 17, and drives the actuator 3a with the generated pulsed voltage. When the drive voltage is on at the time the head slider 7 is retracted due to a power failure or unloaded, the distal end of the actuator 3a is turned in the direction indicated by the arrow R1. When the drive voltage is off, the distal end of the actuator 3a continues to move in the same direction due to inertia.

At this time, a sampler 12a of the sample-and-hold circuit 12 is turned on, and a counterelectromotive force proportional to the rotational speed of the actuator 3a is sampled and held by a holder 12b, which outputs the sampled and held counterelectromotive force as an output voltage.

The output voltage from the sample-and-hold circuit 12 is averaged by the speed voltage averaging circuit 13 and thereafter integrated by the integrating circuit 15, which applies the integrated voltage as a positional voltage S2 to the control circuit 34.

The control circuit 34 compares the positional voltage S2 from the integrating circuit 15 with a reference position voltage S3 established by the reference value table 16, and feeds the result back to the actuator driver circuit 11. The actuator driver circuit 11 varies the duty ratio of pulses, for example, to control the actuator 3a to operate at a desired speed.

In the event that the electric power cannot normally be supplied due to a power failure or the like, the magnetic disk device 30 uses for retracting operation a counterelectromotive force that is generated by the voice coil 8 upon rotation of the magnetic disk 2a.

Operation will be described in detail below.

The actuator driver circuit 11 comprises an H-bridge voltage drive VCM controller, for example, for energizing the actuator 3a with a pulsed voltage having a frequency of 1 kHz, a voltage value of 0.5 V, and a duty ratio of 50%. When the head slider is to be retracted, the actuator 3a is turned in the direction R1, and with the drive voltage being turned off, the counterelectromotive force that is generated by the voice coil 8 is supplied to the sample-and-hold circuit 12.

Time-dependent changes of various elements as the actuator 3a moves will be described below. The fourth embodiment is substantially the same as the first embodiment except that the actuator 3a is energized in the opposite direction. Therefore, time-dependent changes of various elements will be described below with reference to FIGS. 7 and 8A through 8C.

In the fourth embodiment, one loading or unloading (retracting) cycle takes about 0.75 second, and the drive voltage appears across the voice coil when the drive voltage is turned on, and the counterelectromotive force proportional to the angular velocity of the actuator 3a appears across the voice coil when the drive voltage is turned off.

Upon elapse of 130 μm from the start of an off-interval of the drive voltage, the magnetic disk device 10 turns on the sampler 12a to accurately observe the counterelectromotive force from the voice coil.

The magnetic disk device 10 establishes the operating frequency of the sampler 12a in view of the time constant of the voice coil 8 in the same manner as with the first embodiment for reliably extracting the counterelectromotive force from the voice coil.

The counterelectromotive force which is observed by the sample-and-hold circuit 12 is outputted as a speed voltage as shown in FIG. 8A from the holder 12b. Then, the speed voltage is averaged as shown in FIG. 8B by the speed voltage averaging circuit 13, and then converted into a positional voltage as shown in FIG. 8C by the integrating circuit 15. The positional voltage is then applied to the control circuit 14. In this manner, a position loop is established.

Since the counterelectromotive force is proportional to the angular velocity of the actuator 3a, the speed of movement of the head slider 7 along the surface of the magnetic disk 2a is also proportional to the counterelectromotive force.

If the speed of movement of the head slider 7 along the surface of the magnetic disk is 140 mm/s, for example, then the corresponding amplified counterelectromotive force is about 1 V. The speed voltage is applied to the integrating circuit 15, which converts the speed voltage into a positional voltage.

The speed voltage and the positional voltage are then fed back to the control circuit 14, and compared with positional voltage information having a desired profile which is established in the reference value table 16 and that varies from time to time. Depending on the result of comparison, the voltages are outputted as an analog drive voltage to the actuator driver circuit 11 from the control circuit 34, varying the duty ratio of the drive pulses of the actuator driver circuit 11.

The actuator 3a is thus energized to move the head slider 7 at a speed of 140 mm/s or less along the surface of the magnetic disk 2a when the head slider 7 is loaded or unloaded. The actuator 3a is controlled such that the acceleration of the head slider 7 is 10 G or less at the time the head slider 7 collides with the stopper 3c.

As a result, the arm 5 is prevented from violently colliding with the stopper 3c, and the head slider 7 is prevented from colliding with the surface of the magnetic disk 2a with relatively large shocks due to the shocks of the collision of the arm 5 with the stopper 3c.

When the head slider 7 is unloaded or retracted, or the retracting operation thereof is ended, the time that has elapsed from the start of the retracting operation may be measured by the timer 11a, and a mark indicative of the end of the retracting operation may be delivered to an external circuit 1 second after the end of the retracting operation.

Figure 23:
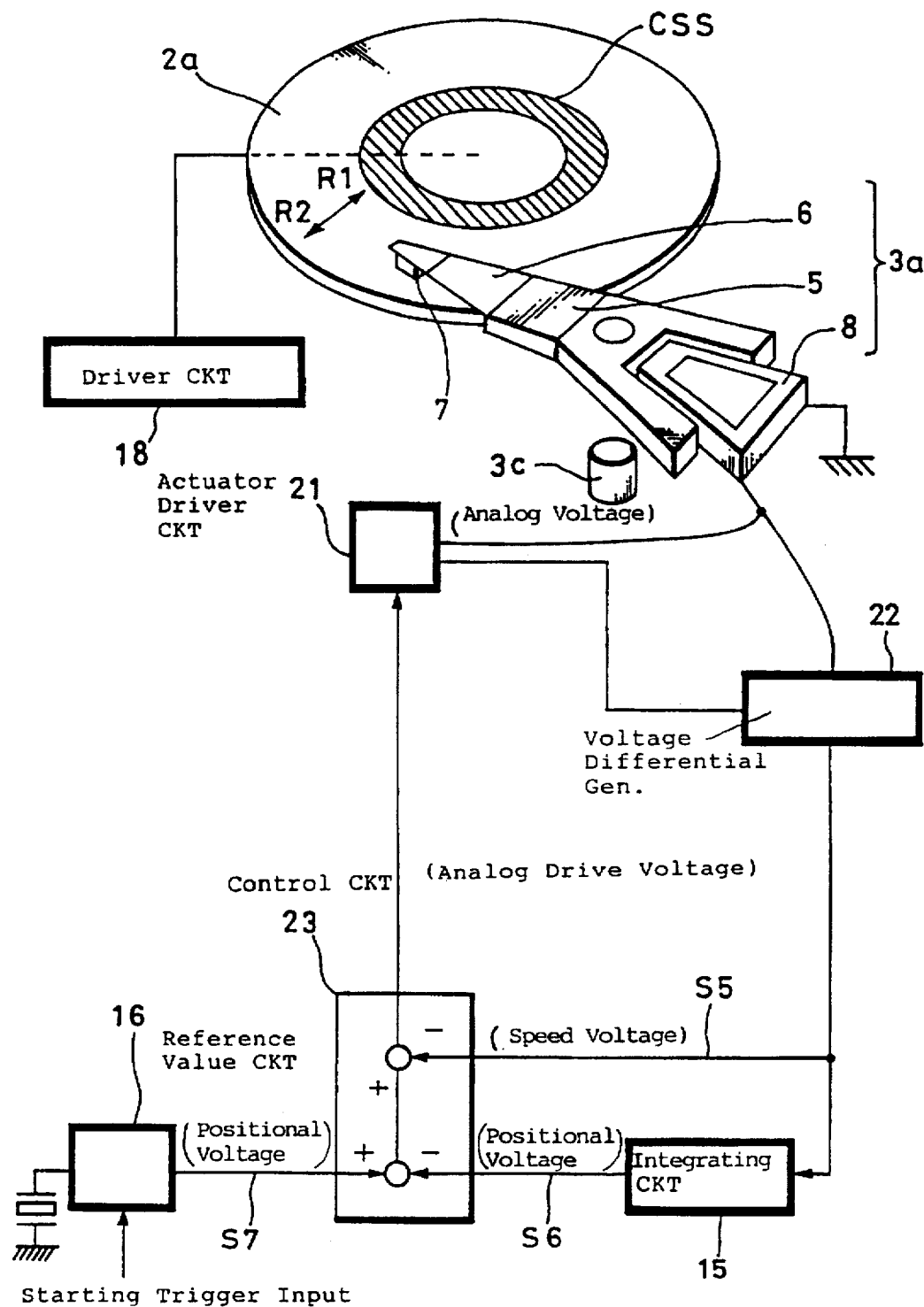
FIG. 23 is a view of a magnetic disk device which incorporates a loading and unloading apparatus according to a fifth embodiment of the present invention.

In the embodiment shown in FIG. 22, the actuator is energized by the same circuit arrangement as with the first embodiment. However, as shown in FIG. 23, an actuator driver circuit 21 may be employed in place of the actuator driver circuit 11 and the oscillating circuit 17, and a voltage differential generator 22 may be employed in place of the sample-and-hold circuit 12 and the speed voltage averaging circuit 13.

With such a modification, the duty ratio of drive pulses applied from the actuator driver circuit 21 to the actuator 3a is fixed to 50%, and the rotational speed of the actuator 3a is controlled by adjusting the voltage of the drive pulses of the actuator driver circuit 21.

In the embodiment shown in FIG. 5, the output signal from the sample-and-hold circuit 12 is averaged by the speed voltage averaging circuit 13, and thereafter applied as a speed voltage to the control circuit 14, and also applied through the integrating circuit 15 as a positional voltage S2 to the control circuit 14.

Specifically, not only the speed of the head slider 7 with respect to the magnetic disk 2a at the time it is loaded and unloaded, but also the position in which the head slider 7 is loaded or unloaded is controlled.

Figure 24:
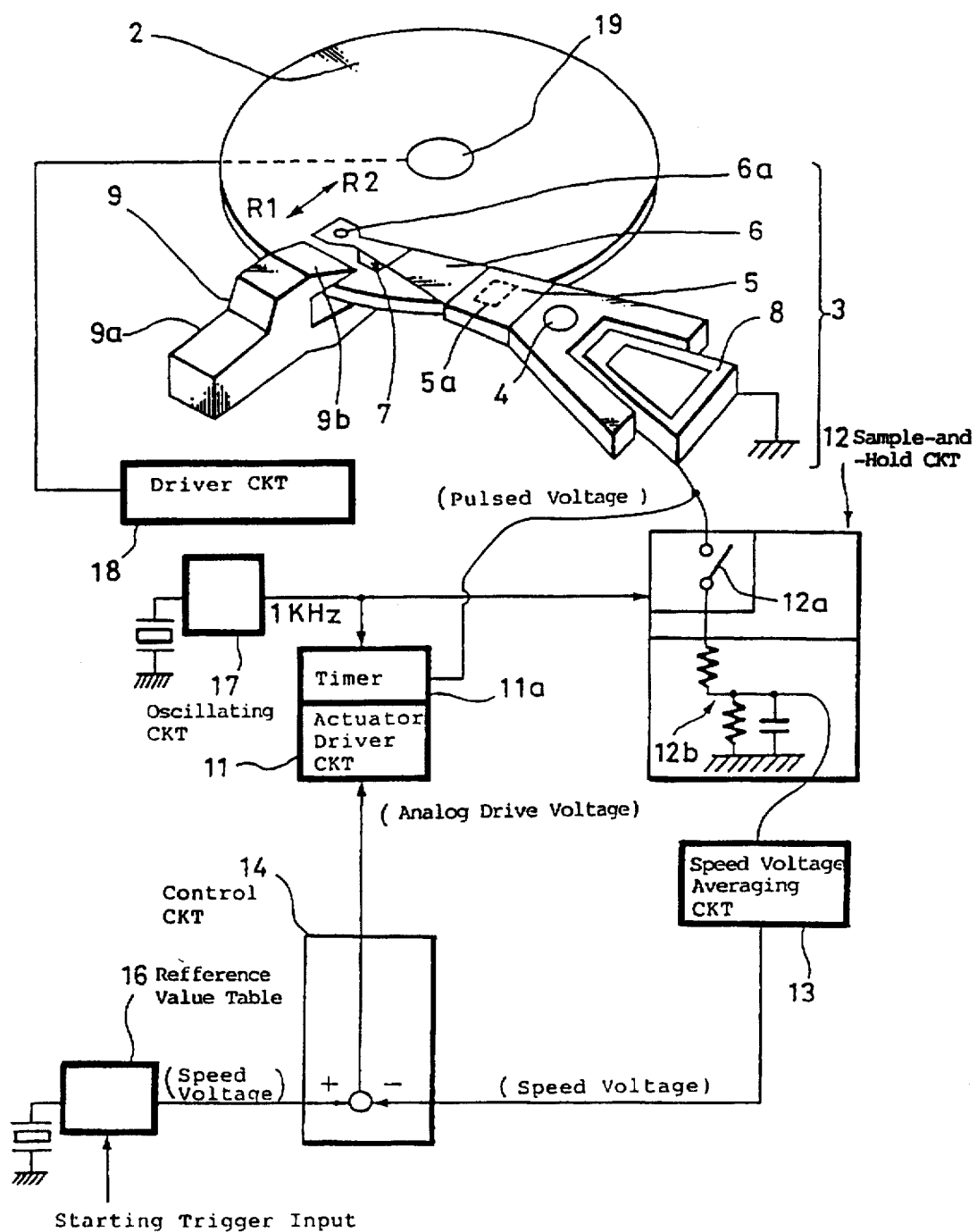
FIG. 24 is a view of a magnetic disk device which incorporates a loading and unloading apparatus according to a sixth embodiment of the present invention.

However, since only the speed of the head slider 7 with respect to the magnetic disk 2a may be controlled in order to prevent the head slider 7 from colliding with the magnetic disk 2a, the loading/unloading device may dispense with a positional control arrangement as shown in FIG. 24. In this case, a speed voltage is supplied from a reference value table 16 to a control circuit 23.

In the embodiment shown in FIG. 22, both speed control and positional control are carried out at the same time. However, positional control may be dispensed with as shown in FIG. 25.

Figure 25:
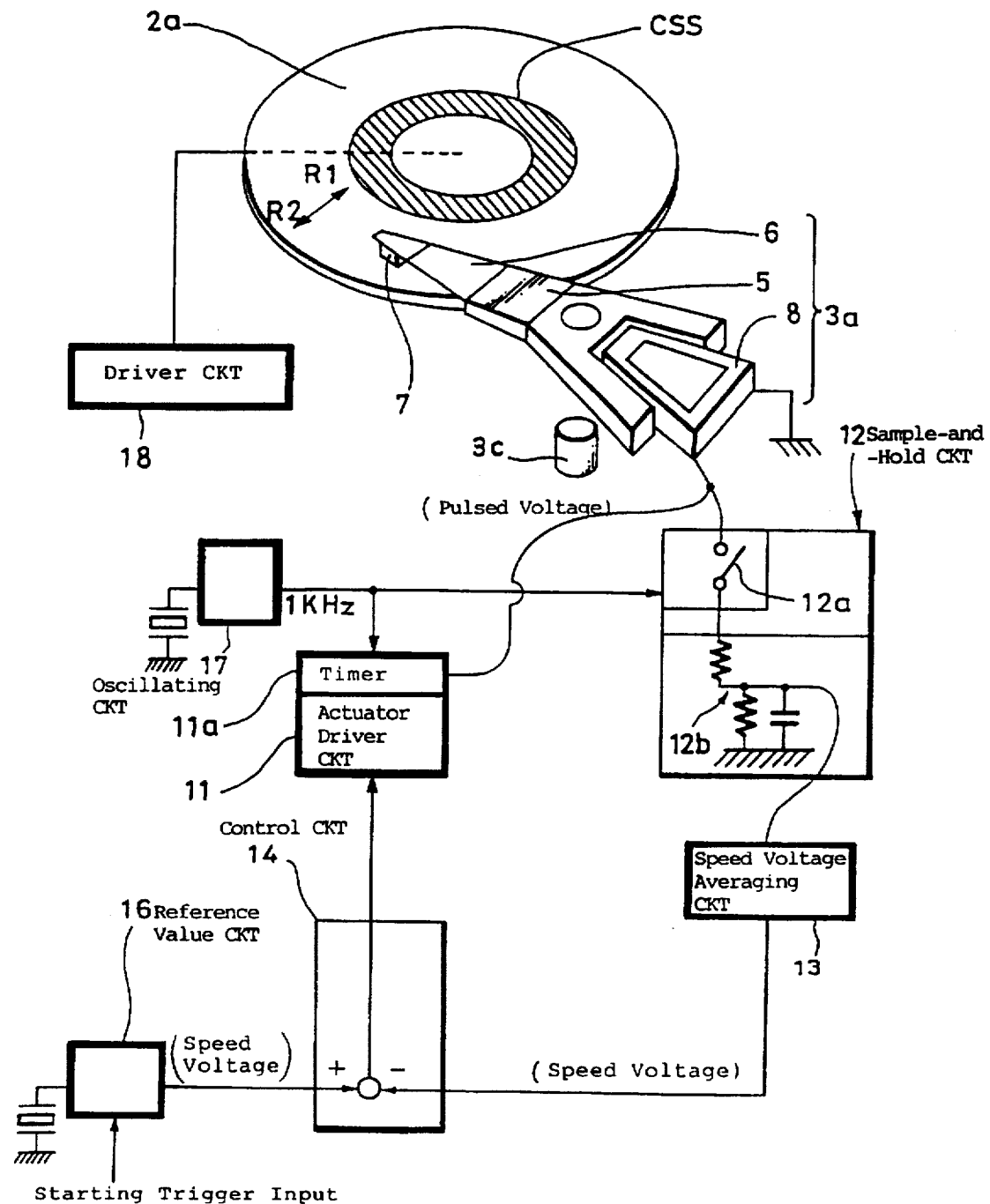
FIG. 25 is a view of a magnetic disk device which incorporates a loading and unloading apparatus according to a seventh embodiment of the present invention.
Figure 26:
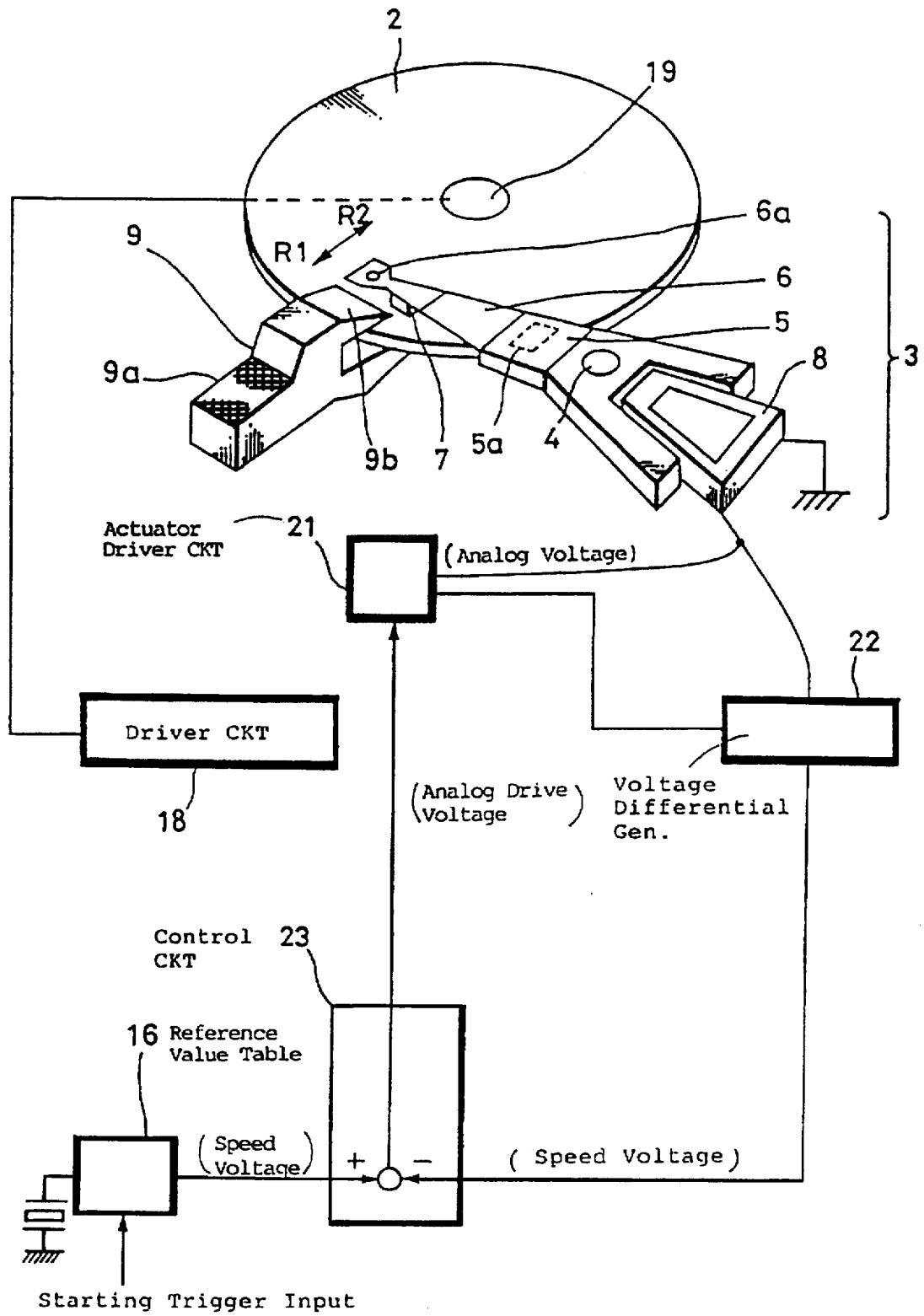
FIG. 26 is a view of a magnetic disk device which incorporates a loading and unloading apparatus according to an eighth embodiment of the present invention.
Figure 27:
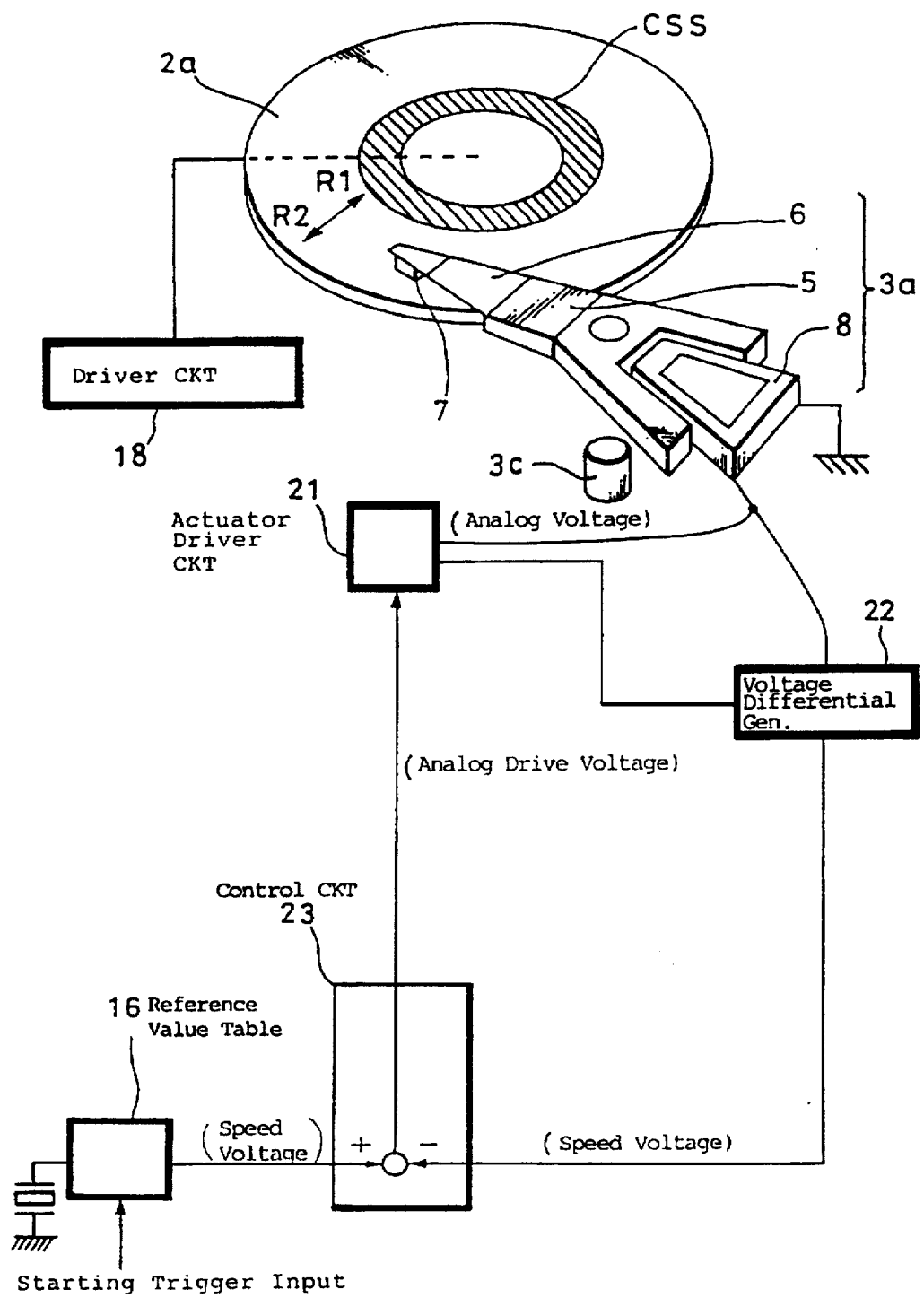
FIG. 27 is a view of a magnetic disk device which incorporates a loading and unloading apparatus according to a ninth embodiment of the present invention.

Furthermore, as shown in FIGS. 26 and 27 which correspond respectively to the embodiments shown in FIGS. 24 and 25, an actuator driver circuit 21 may be employed in place of the actuator driver circuit 11 and the oscillating circuit 17, and a voltage differential generator 22 may be employed in place of the sample-and-hold circuit 12 and the speed voltage averaging circuit 13.

Figure 28:
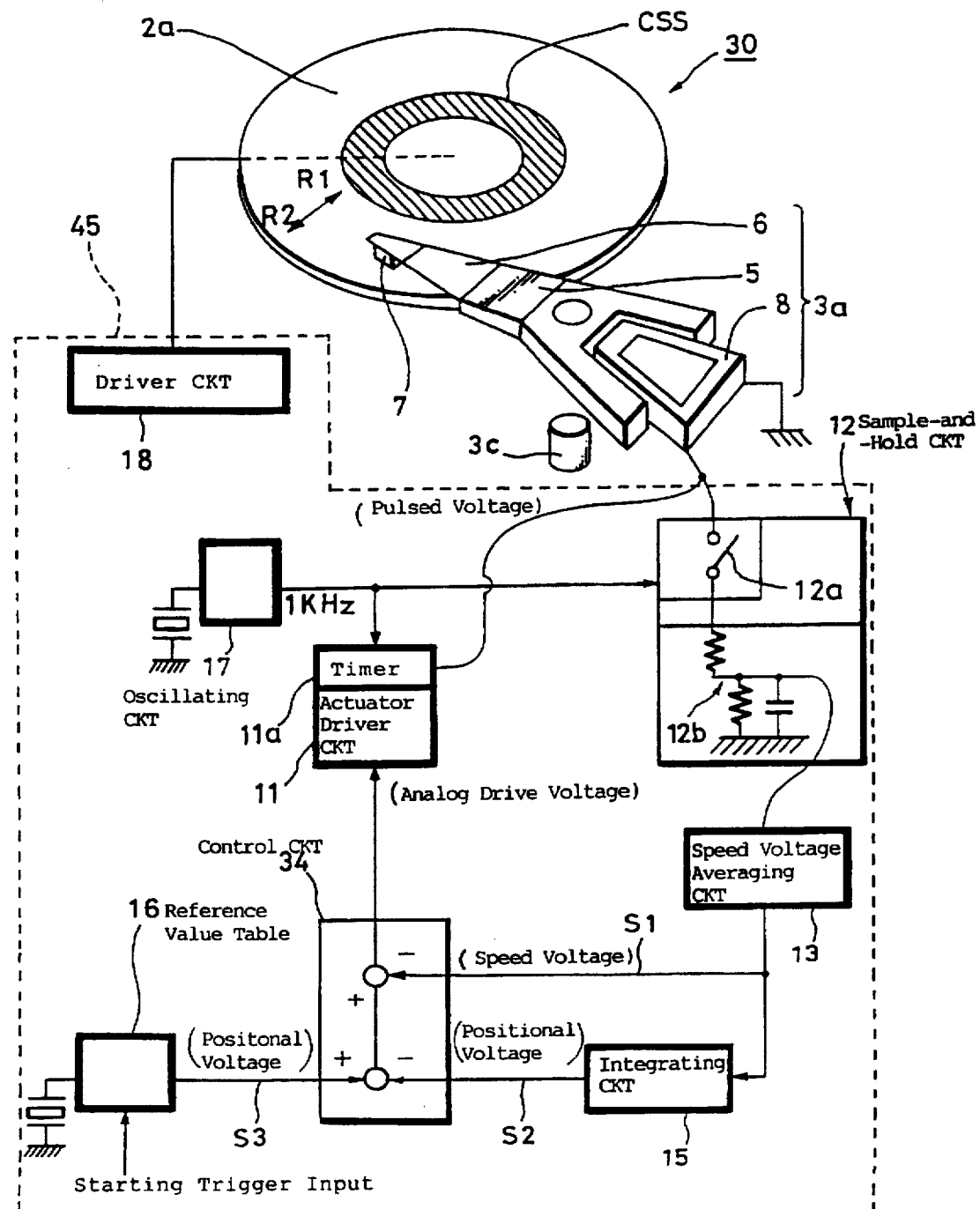
FIG. 28 is a view of a magnetic disk device which incorporates a loading and unloading apparatus according to a tenth embodiment of the present invention.
Figure 29:
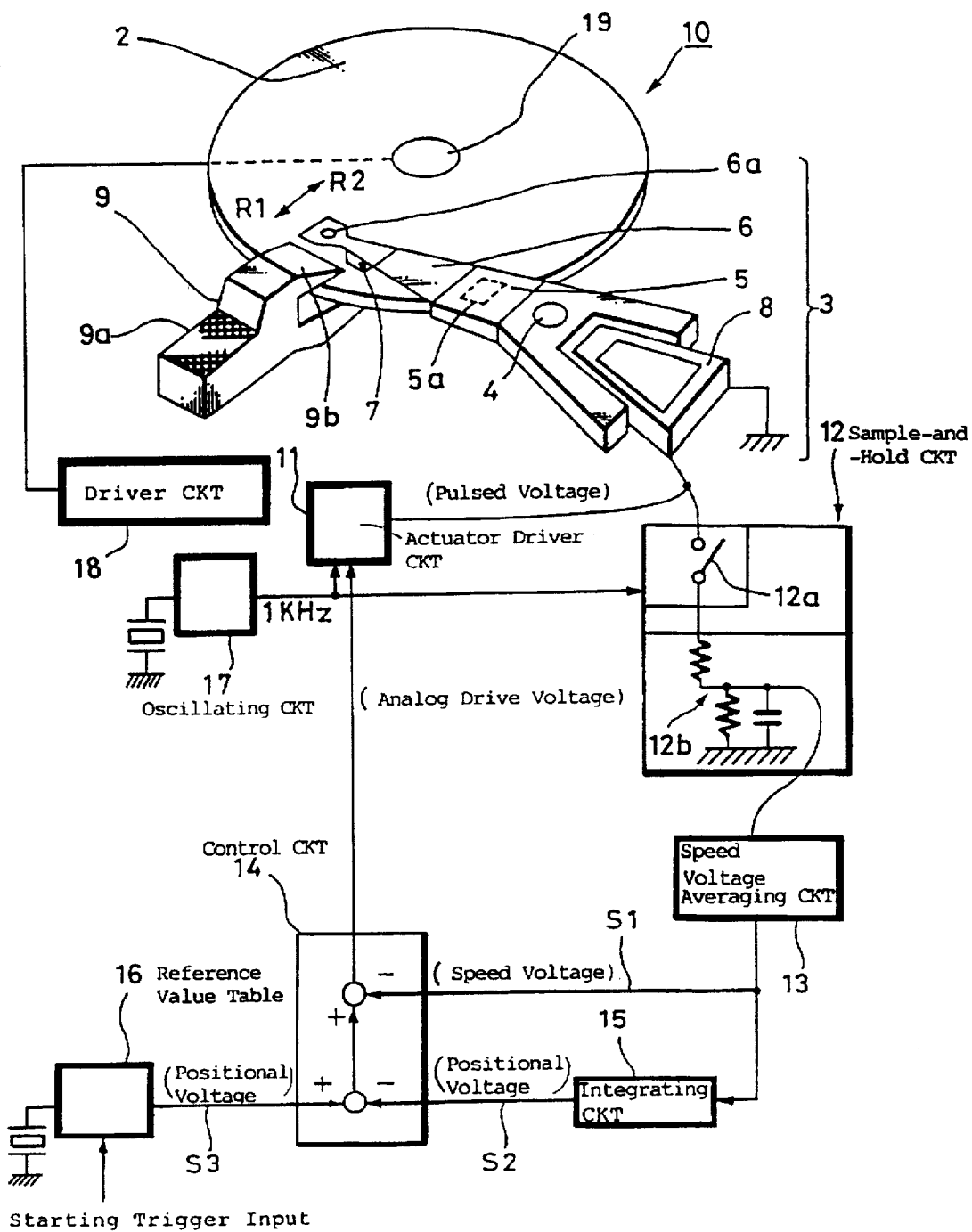
FIG. 29 is a view of a magnetic disk device which incorporates a loading and unloading apparatus according to an eleventh embodiment of the present invention.
Figure 30:
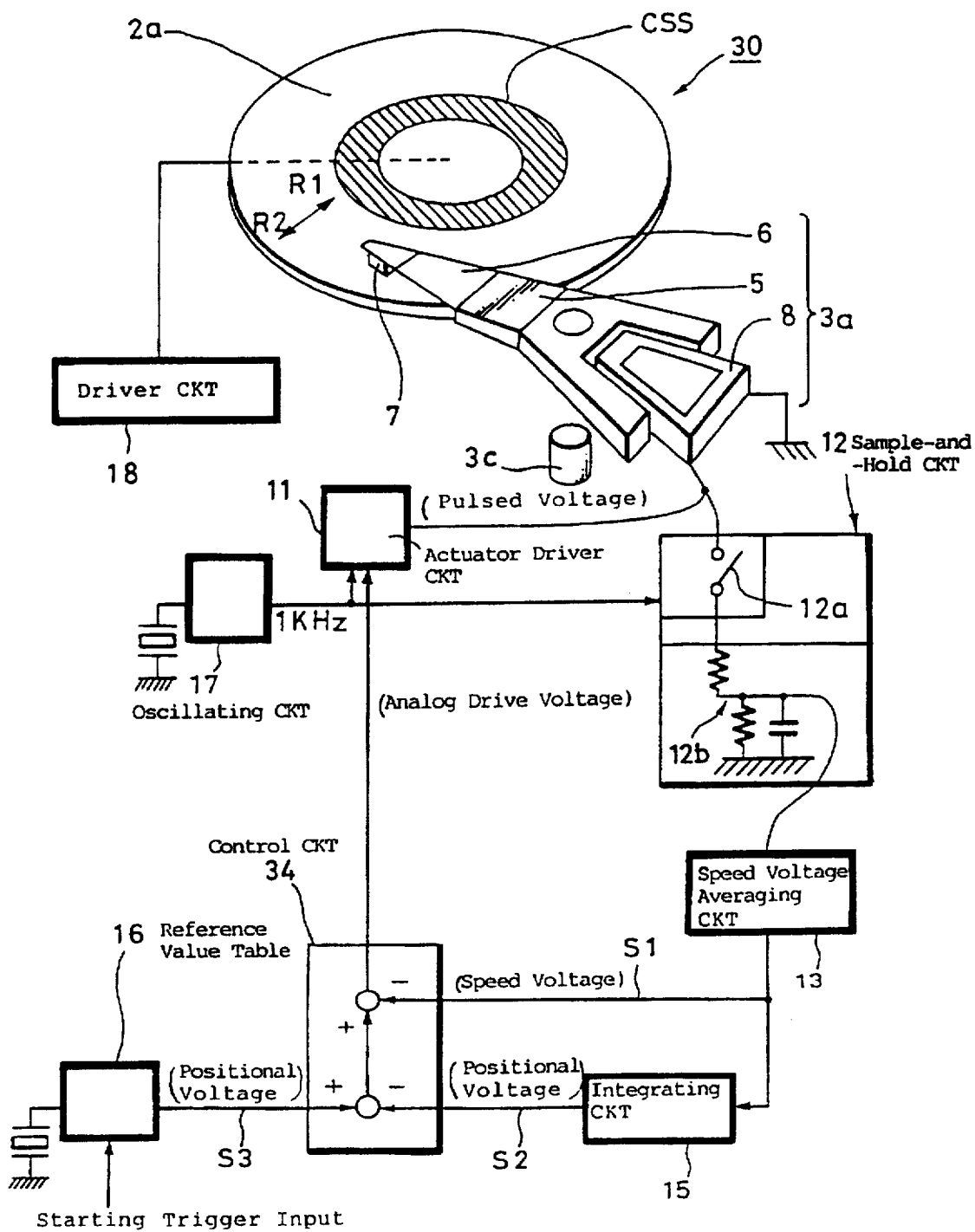
FIG. 30 is a view of a magnetic disk device which incorporates a loading and unloading apparatus according to a twelfth embodiment of the present invention.
Figure 31:
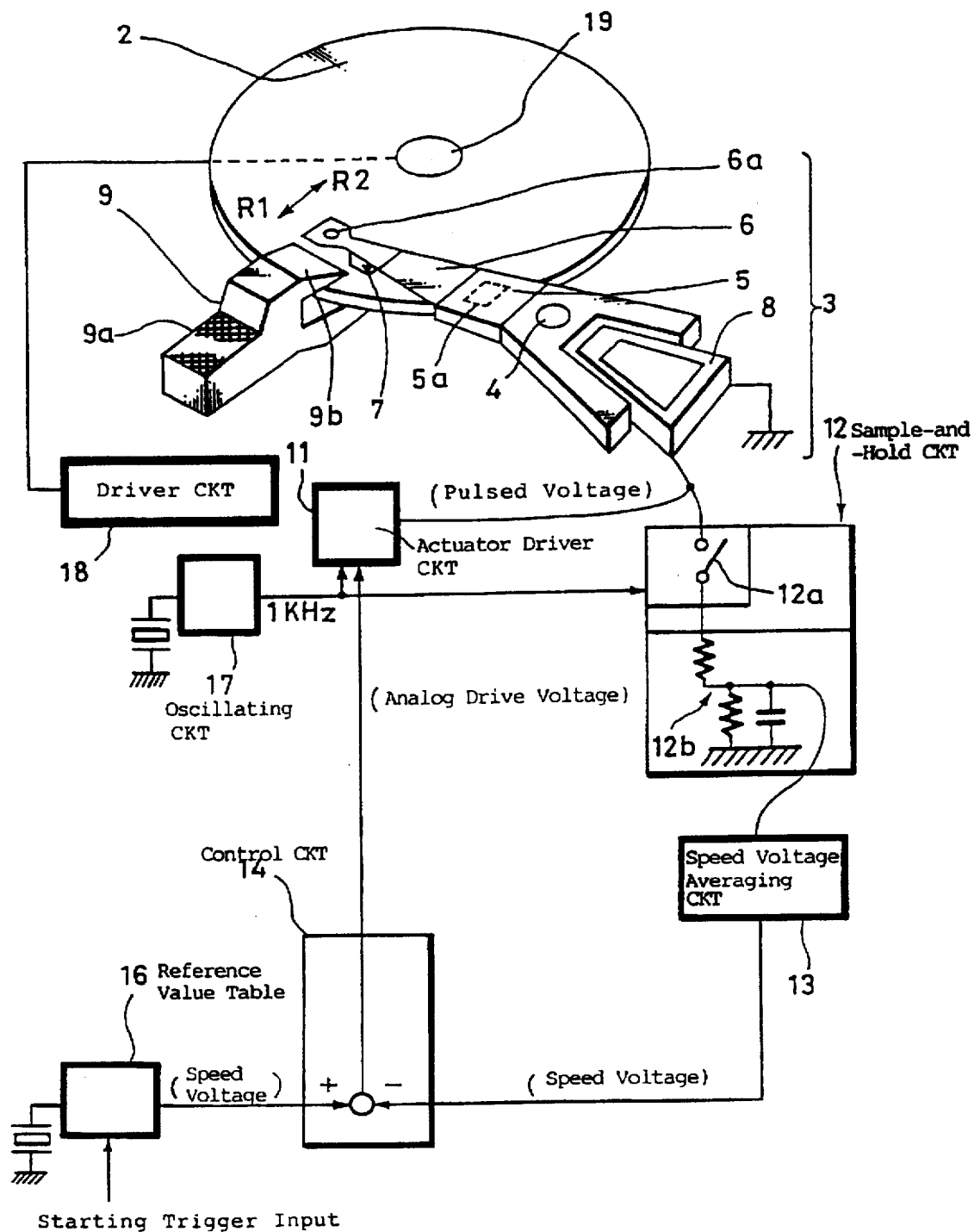
FIG. 31 is a view of a magnetic disk device which incorporates a loading and unloading apparatus according to a thirteenth embodiment of the present invention.
Figure 32:
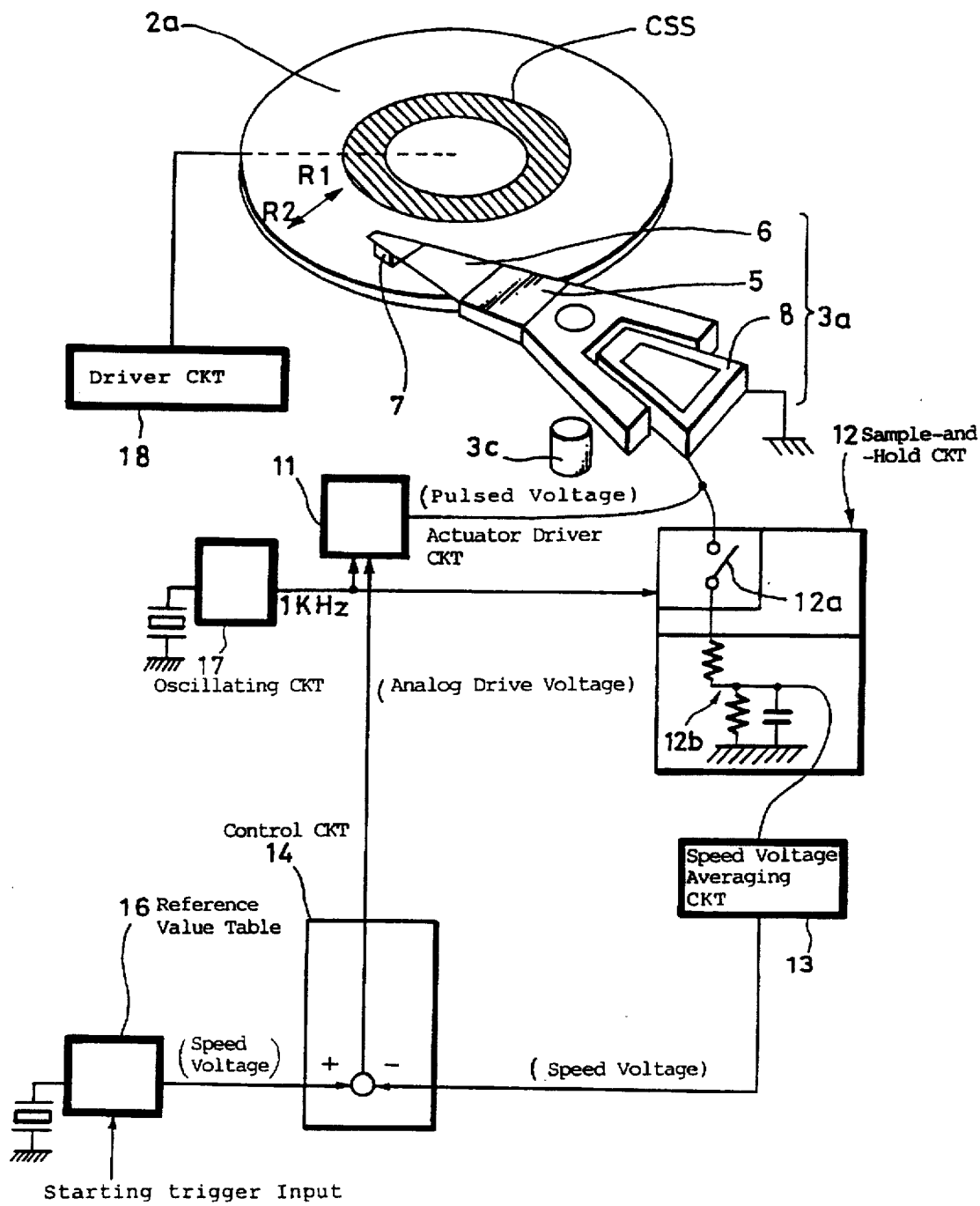
FIG. 32 is a view of a magnetic disk device which incorporates a loading and unloading apparatus according to a fourteenth embodiment of the present invention.

FIG. 28 shows a further embodiment according to the present invention.

Those parts shown in FIG. 28 which are identical to those shown FIG. 22 are denoted by identical reference numerals, and will not be described in detail below.

Figure 2:
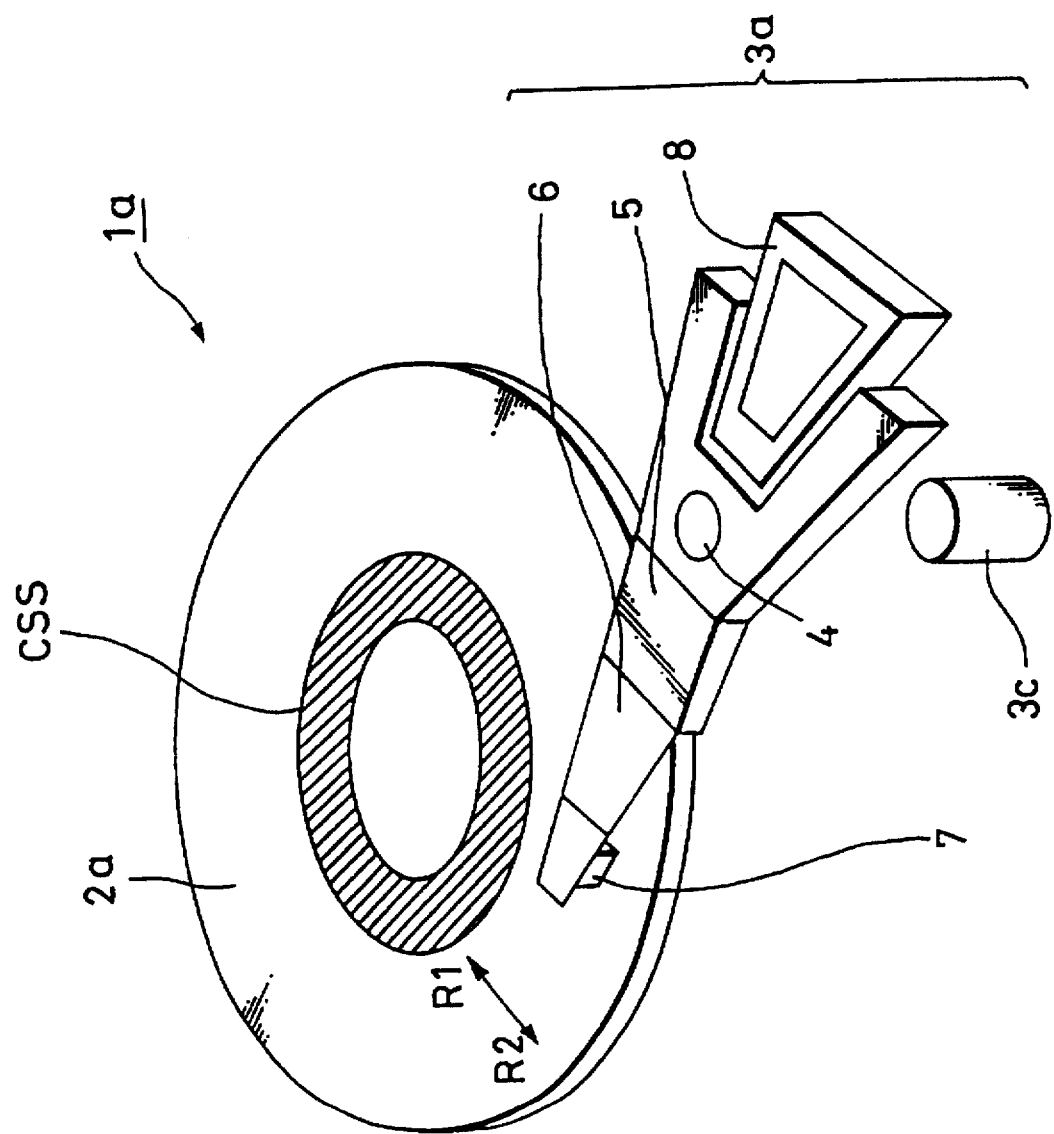
FIG. 2 is a perspective view of a magnetic disk device which employs a conventional CSS configuration.
Figure 3:
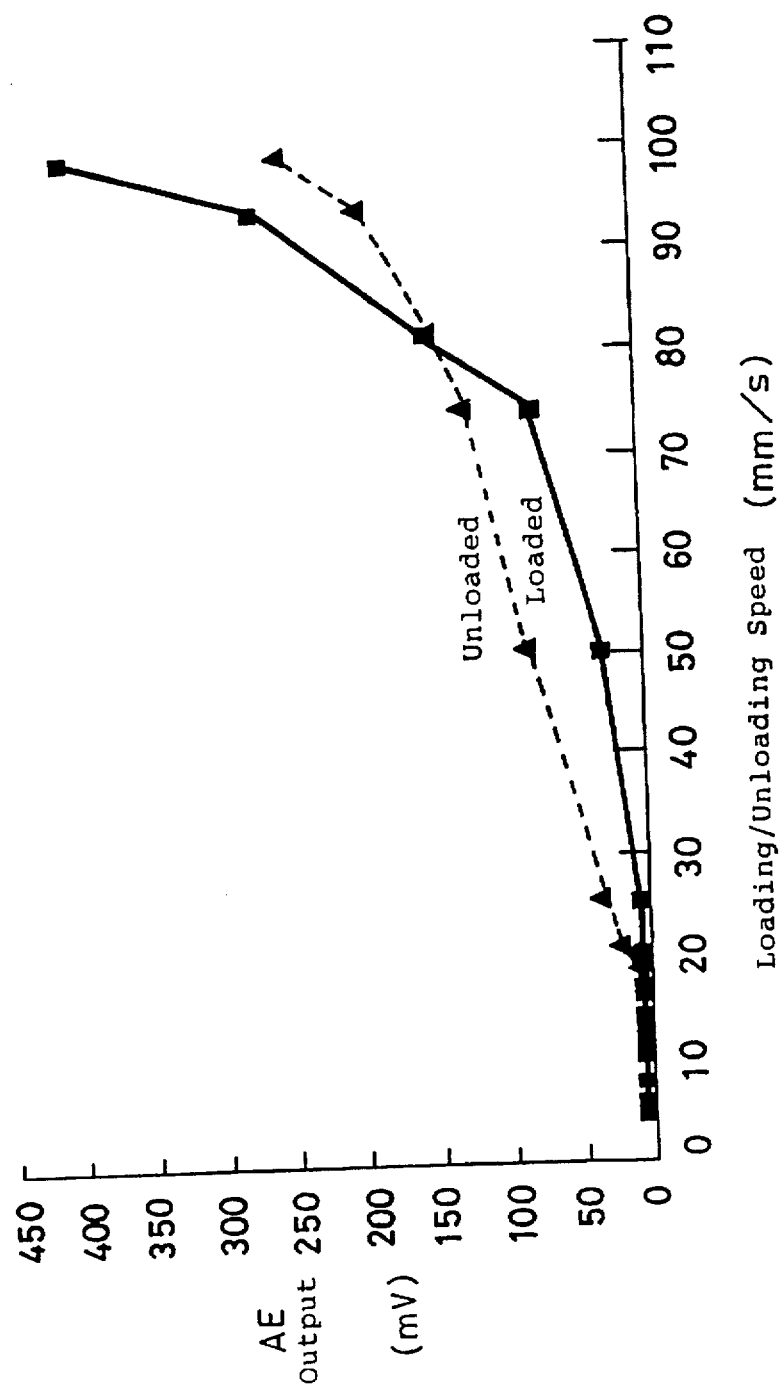
FIG. 3 is a graph showing how an output signal from an AE sensor mounted on an arm varies with respect to loading and unloading speeds in the magnetic disk device shown in FIG. 1.
Figure 4:
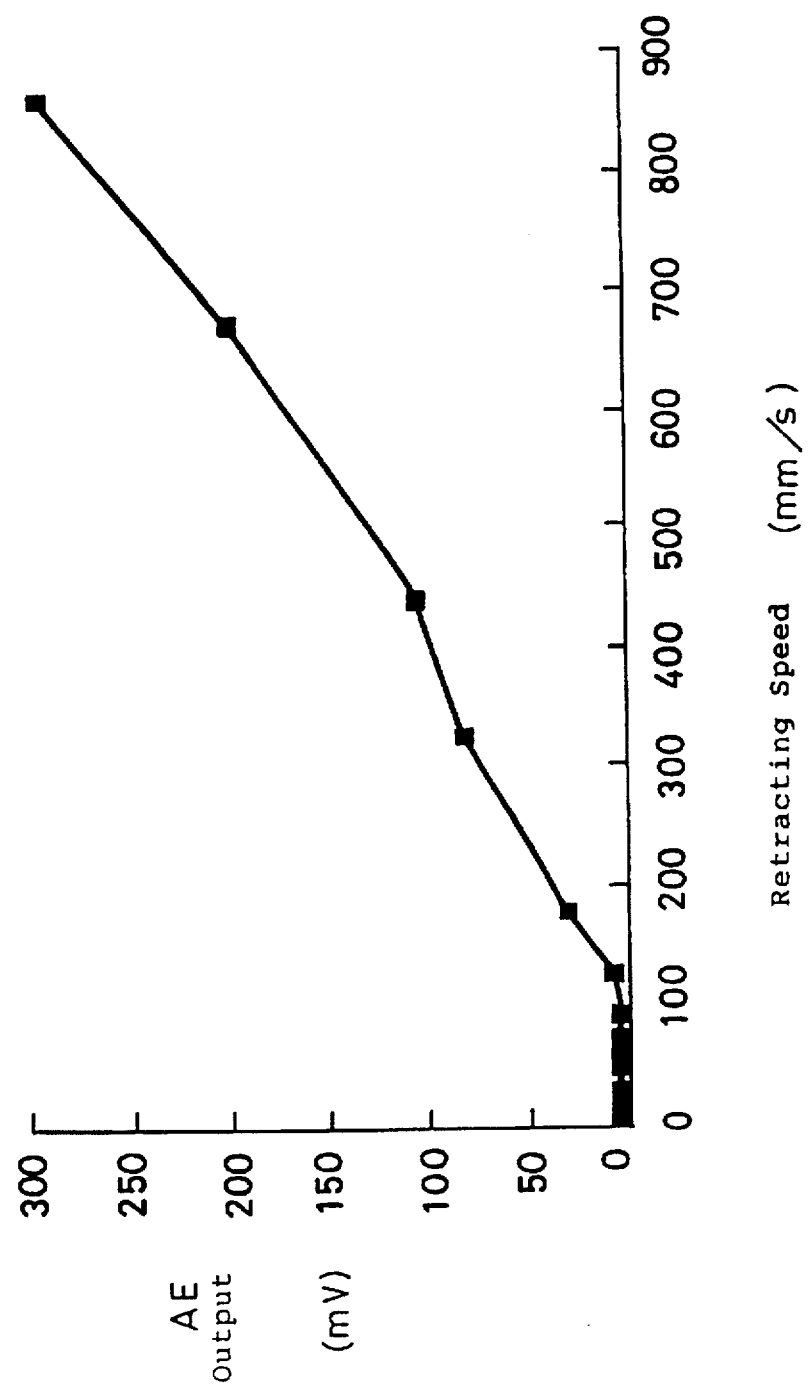
FIG. 4 is a graph showing how an output signal from an AE sensor mounted on an arm varies with respect to a retracting speed in the magnetic disk device shown in FIG. 1.

The magnetic disk device according to the embodiment shown in FIG. 28 differs from the embodiment shown in FIG. 2 in that the drive control means for the actuator 3a is constructed as a drive control circuit 45 integrated on one board.

The first drive control circuit 45 preferably includes the driver circuit 18 for energizing the motor 19 to rotate the magnetic disk 2.

The embodiment shown in FIG. 28 operates in the same manner and offers the same advantages as the embodiment shown in FIG. 22.

The sample-and-hold circuit 12 has a switching arrangement which may preferably be any one of the circuits shown in FIGS. 12 through 17.

FIGS. 29, 30, 31, and 32 show respective magnetic disk devices which incorporate loading and unloading apparatus according to other embodiments of the present invention. The embodiment shown in FIG. 29 dispenses with the timer 11a in the embodiment shown in FIG. 5, and is otherwise the same as the embodiment shown in FIG. 5 with respect to structure and operation. The embodiment shown in FIG. 30 dispenses with the timer 11a in the embodiment shown in FIG. 22, and is otherwise the same as the embodiment shown in FIG. 22 with respect to structure and operation. The embodiment shown in FIG. 31 dispenses with the timer 11a in the embodiment shown in FIG. 24, and is otherwise the same as the embodiment shown in FIG. 24 with respect to structure and operation. The embodiment shown in FIG. 32 dispenses with the timer 11a in the embodiment shown in FIG. 25, and is otherwise the same as the embodiment shown in FIG. 25 with respect to structure and operation.

The actuator driver circuits in the above embodiments energize the respective actuators by way of PWM. However, the actuator driver circuits may energize the respective actuators by way of PAM (pulse amplitude modulation).

In the above embodiments, when the electric power cannot normally be supplied due to a power failure or the like, the magnetic disk device uses for retracting operation a counterelectromotive force that is generated by the voice coil upon rotation of the magnetic disk. However, electric energy stored in a capacitor associated with the loading/unloading device may be used for retracting operation, or electric energy stored in an electric power storage device which stores electric energy for use in case of emergency may be used for retracting operation.

In the case where the drive control circuit for the actuator 3a is fabricated on one board, the reference voltage S3 from the reference value table 14 may be given from outside of the drive control circuits 41, 45.

The frequency and magnitude of the pulsed voltage from the oscillating circuit 17 may be established from outside of the drive control circuits 41, 45.

The magnitude of the signal fed from the control circuits 14, 34 back to the actuator driver circuits 11, 31 may be established from outside of the drive control circuits 41, 45.

According to the present invention, as described above, the arm is actuated with pulses, and a counterelectromotive force from the drive source is observed when the drive voltage is turned off, and fed back to the actuator driver circuit. Therefore, the speed at which the arm is actuated can be controlled such that the speed of the head slider with respect to the disk at the time the head slider is loaded and unloaded will become a speed or lower which does not obstruct loading and unloading operation. The danger of collision between the head slider and the disk is thus minimized at the time the head slider is loaded, unloaded, and retracted. The head slider can now be loaded, unloaded, and retracted with safety.

We claim:

1. A loading and unloading apparatus for a magnetic disk device having a rotatable information recording disk, an arm supporting a head slider with a suspension for movement along a surface of the disk, a voice-coil-type drive mechanism for driving the arm, and a mechanism for retracting said head slider into a retraction area out of a data zone of the disk, said loading and unloading apparatus comprising:

circuit means for energizing said voice-coil-type drive mechanism;

means for directly measuring a voltage value of a counterelectromotive force generated in a voice coil of the voice-coil-type drive mechanism;

means for calculating a speed of the arm from said voltage value of the counterelectromotive force;

means for adjusting a drive current based on the speed of the arm;

the arrangement being such that closed-loop control is carried out based on the speed of the arm when the head slider is loaded or unloaded;

wherein said circuit means comprises a pulse drive circuit, and said means for measuring comprises a sampling measuring circuit; and wherein said pulse drive circuit has a drive frequency f represented by:

$$f < R/2L$$

where R is a resistance component of said voice-coil-type drive mechanism and L is an inductance component of said voice-coil-type drive mechanism.

2. A loading and unloading apparatus according to claim 1, wherein said retraction area is formed outside of the disk in a non-contact start-stop configuration.

3. A loading and unloading apparatus according to claim 1, wherein said retraction area is formed on the disk in a contact start-stop configuration.

4. A loading and unloading apparatus according to any one of claims 1 through 3, further comprising:

means for calculating a position of the arm from the speed of the arm; and means for adjusting a drive current value based on the speed of the arm and the position of the arm;

the arrangement being such that closed-loop control is carried out based on the speed of the arm and the position of the arm when the head slider is loaded or unloaded.

5. A loading and unloading apparatus according to claim 4, wherein said means for calculating a position of the arm calculates the position of the arm by integrating the speed which has been detected by said means for calculating a speed of the arm.

6. A loading and unloading apparatus according to claim 1, wherein said pulse drive circuit comprises a pulse-width-modulation circuit.

7. A loading and unloading apparatus according to claim 1, wherein said pulse drive circuit comprises a pulse-amplitude-modulation circuit.

8. A loading and unloading apparatus according to any one of claims 1 through 3, wherein said circuit means comprises an analog drive circuit, and said means for measuring comprises an analog measuring circuit.

9. A loading and unloading apparatus according to claim 1, wherein the speed of said arm is controlled such that the speed of said head slider with respect to the disk when the head slider is loaded onto or unloaded from the disk does not exceed 140 mm/s in a direction parallel to the surface of the disk.

10. A loading and unloading apparatus according to claim 1, wherein the speed of said arm is controlled such that the speed of said head slider with respect to the disk when the head slider is loaded onto or unloaded from the disk does not exceed 20 mm/s in a direction perpendicular to the surface of the disk.

11. A loading and unloading apparatus according to claim 1, wherein said means for calculating a speed of the arm measures a speed of the arm a plurality of times and thereafter averages measured speeds.

12. A loading and uploading apparatus according to claim 1, wherein the head slider is unloaded by a counterelectromotive force of a motor which rotates the disk when the head slider is to be retracted.

13. A loading and unloading apparatus according to claim 1, wherein the head slider is unloaded by electric energy stored in a capacitor or an electric power storage device associated with the loading and unloading apparatus when the head slider is to be retracted.

14. A loading and unloading apparatus according to any one of claims 1 through 3, wherein said head slider is loaded and unloaded into a position in an outer circumferential region of the disk, which position is determined by $r1<\theta<r2$ (r1, r2 are constants where r1<r2) and $\theta1<r<\theta2$ ($\theta1$, $\theta2$ are constants where $\theta1<\theta2$) where r represents a position in the radial direction of the disk and $\theta$ represents a position in the circumferential direction of the disk.

15. A drive control circuit for a loading and unloading apparatus for a magnetic disk device having a rotatable information recording disk, an arm supporting a head slider with a suspension for movement along a surface of the disk, a voice-coil-type drive mechanism for driving the arm, and a mechanism for retracting said head slider into a retraction area other than a data zone of the disk, said drive control circuit being connected to said voice-coil-type drive mechanism, said drive control circuit comprising:

circuit means for energizing said voice-coil-type drive mechanism comprising a pulse drive circuit;

means for measuring a counterelectromotive force generated in a voice coil of the voice-coil-type drive mechanism, wherein said means for measuring measures said counterelectromotive force between pulses of said pulse drive circuit;

means for calculating a speed of the arm from a voltage value of the counterelectromotive force;

means for adjusting a drive current based on the speed of the arm;

the arrangement being such that closed-loop control is carried out based on the speed of the arm when the head slider is loaded or unloaded; and wherein said pulse drive circuit has a drive frequency f represented by:

$$f < R/2L$$

where R is a resistance component of said voice-coil-type drive mechanism and L is an inductance component of said voice-coil-type drive mechanism.

16. A drive control circuit according to claim 15, further comprising:

means for calculating a position of the arm from the speed of the arm.

17. A drive control circuit according to claim 15, wherein said means for measuring comprises a sampling measuring circuit.

18. A drive control circuit according to claim 15, wherein said pulse drive circuit comprises a pulse-width-modulation circuit.

19. A drive control circuit according to claim 15, wherein said pulse drive circuit comprises a pulse-amplitude-modulation circuit.

20. A drive control circuit according to claim 15, wherein said means for measuring a counterelectromotive force comprises sampling means for sampling the counterelectromotive force generated by the voice coil, said sampling means comprising either:

MOSFET switches; or an analog switch and two resistors connected in series between ground and said voice coil, and a capacitor connected to ground and a point between said two resistors.

21. A drive control circuit according to claim 15, wherein the speed of said arm is controlled such that the speed of said head slider with respect to the disk when the head slider is loaded onto or unloaded from the disk does not exceed 140 mm/s in a direction parallel to the surface of the disk.

22. A drive control circuit according to claim 15, wherein the speed of said arm is controlled such that the speed of said head slider with respect to the disk when the head slider is loaded onto or unloaded from the disk does not exceed 20 mm/s in a direction perpendicular to the surface of the disk.

23. A drive control circuit according to claim 15, wherein said means for calculating a speed of the arm measures a speed of the arm a plurality of times and thereafter averages measured speeds.

24. A drive control circuit according to claim 15, wherein said means for calculating a position of the arm calculates the position of the arm by integrating the speed which has been detected by said means for calculating a speed of the arm.

25. A drive control circuit according to claim 15, wherein after said arm is loaded onto or unloaded from the disk at a desired speed, the arm moves over the disk at said desired speed into abutment against a stopper, and the arm finishes a loading or unloading process upon elapse of a period of time sufficient for said head slider to stop outside of a recording area of the disk.

26. A drive control circuit according to claim 15, wherein after said arm is loaded onto the disk at a desired speed, the arm moves over the disk at said desired speed, and the arm finishes a loading or unloading process when a head receives a signal indicating that the arm has been loaded from the disk.

27. A drive control circuit according to claim 15, wherein the head slider is unloaded by a counterelectromotive force of a motor which rotates the disk when the head slider is to be retracted.

28. A drive control circuit according to claim 15, wherein the head slider is unloaded by electric energy stored in a capacitor or an electric power storage device associated with the loading and unloading apparatus when the head slider is to be retracted.

29. A drive control circuit according to claim 15, wherein said head slider is loaded and unloaded into a position in an outer circumferential region of the disk, which position is determined by $r1<\theta<r2$ (r1, r2 are constants where r1<r2) and $\theta1<r<\theta2$ ($\theta1$, $\theta2$ are constants where $\theta1<\theta2$) where r represents a position in the radial direction of the disk and $\theta$ represents a position in the circumferential direction of the disk.

30. A drive control circuit according to claim 15, further including a function to energize a spindle motor to drive the disk.

31. A drive control circuit according to claim 15, wherein said loading and unloading apparatus is of the non-contact start-stop type.

32. A drive control circuit according to claim 15, wherein said loading and unloading apparatus is of the contact start-stop type.

33. A drive control circuit for a loading and unloading apparatus for a magnetic disk device having a rotatable information recording disk, an arm supporting a head slider with a suspension for movement along a surface of the disk, a voice-coil-type drive mechanism for driving the arm, and a mechanism for retracting said head slider into a retraction area other than a data zone of the disk, said drive control circuit being connected to said voice-coil-type drive mechanism, said drive control circuit comprising:

circuit means for energizing said voice-coil-type drive mechanism comprising a pulse drive circuit;

means for measuring a counterelectromotive force generated in a voice coil of the voice-coil-type drive mechanism, wherein said means for measuring measures said counterelectromotive force between pulses of said pulse drive circuit;

means for calculating a speed of the arm from a voltage value of the counterelectromotive force;

means for adjusting a drive current based on the speed of the arm; and the arrangement being such that closed-loop control is carried out based on the speed of the arm when the head slider is loaded or unloaded;

wherein said means for measuring a counterelectromotive force grounds both terminals of the voice coil after a drive pulse is turned off and until the counterelectromotive force is measured.

34. A drive control circuit for a loading and unloading apparatus for a magnetic disk device having a rotatable information recording disk, an arm supporting a head slider with a suspension for movement along a surface of the disk, a voice-coil-type drive mechanism for driving the arm, and a mechanism for retracting said head slider into a retraction area other than a data zone of the disk, said drive control circuit being connected to said voice-coil-type drive mechanism, said drive control circuit comprising:

circuit means for energizing said voice-coil-type drive mechanism comprising a pulse drive circuit;

means for measuring a counterelectromotive force generated in a voice coil of the voice-coil-type drive mechanism, wherein said means for measuring measures said counterelectromotive force between pulses of said pulse drive circuit;

means for calculating a speed of the arm from a voltage value of the counterelectromotive force;

means for adjusting a drive current based on the speed of the arm; and the arrangement being such that closed-loop control is carried out based on the speed of the arm when the head slider is loaded or unloaded;

wherein said means for measuring a counterelectromotive force grounds a terminal of the voice coil after a drive pulse is turned off and until the counterelectromotive force is measured.

35. A drive control circuit for a loading and unloading apparatus for a magnetic disk device having a rotatable information recording disk, an arm supporting a head slider with a suspension for movement along a surface of the disk, a voice-coil-type drive mechanism for driving the arm, and a mechanism for retracting said head slider into a retraction area other than a data zone of the disk, said drive control circuit being connected to said voice-coil-type drive mechanism, said drive control circuit comprising:

circuit means for energizing said voice-coil-type drive mechanism comprising a pulse drive circuit;

means for measuring a counterelectromotive force generated in a voice coil of the voice-coil-type drive mechanism, wherein said means for measuring measures said counterelectromotive force between pulses of said pulse drive circuit;

means for calculating a speed of the arm from a voltage value of the counterelectromotive force;

means for adjusting a drive current based on the speed of the arm; and the arrangement being such that closed-loop control is carried out based on the speed of the arm when the head slider is loaded or unloaded;

wherein said means for measuring a counterelectromotive force comprises a switch for preventing oscillation, said switch being turned off when a drive pulse is turned off.

* * * * *